(12) United States Patent
Duan et al.

(10) Patent No.: US 9,906,984 B2
(45) Date of Patent: Feb. 27, 2018

(54) NETWORK ACCESS PROCESSING METHOD, AND USER EQUIPMENT

(71) Applicant: Huawei Device Co., Ltd., Shenzhen (CN)

(72) Inventors: Xiaoyan Duan, Beijing (CN); Guowei Ouyang, Beijing (CN); Chenliang Gao, Shenzhen (CN); Hui Jin, Beijing (CN); Qiang Yi, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 144 days.

(21) Appl. No.: 14/827,664

(22) Filed: Aug. 17, 2015

(65) Prior Publication Data

US 2015/0358857 A1 Dec. 10, 2015

Related U.S. Application Data

(63) Continuation of application No. PCT/CN2014/072073, filed on Feb. 14, 2014.

(30) Foreign Application Priority Data

Feb. 18, 2013 (CN) .......................... 2013 1 0052652
Mar. 30, 2013 (CN) .......................... 2013 1 0110289

(51) Int. Cl.
*H04W 28/08* (2009.01)
*H04W 48/16* (2009.01)
(Continued)

(52) U.S. Cl.
CPC ........... *H04W 28/08* (2013.01); *H04W 48/16* (2013.01); *H04W 36/0066* (2013.01); *H04W 84/12* (2013.01)

(58) Field of Classification Search
None
See application file for complete search history.

(56) References Cited

U.S. PATENT DOCUMENTS

2007/0232301 A1* 10/2007 Kueh .................... H04W 8/082
                                                         455/433
2011/0085498 A1   4/2011 Oba et al.
(Continued)

FOREIGN PATENT DOCUMENTS

CN          101223804 A      7/2008
CN          101472262 A      7/2009
(Continued)

OTHER PUBLICATIONS

Foreign Communication From a Counterpart Application, European Application No. 14751564.7, Extended European Search Report dated Dec. 2, 2015, 6 pages.
(Continued)

*Primary Examiner* — Candal Elpenord
(74) *Attorney, Agent, or Firm* — Conley Rose, P.C.

(57) ABSTRACT

A network access processing method and user equipment, where the UE accesses a first VPLMN through a first access network, and accesses a second VPLMN through a second access network; the UE determines, according to either an ANDSF policy of the first VPLMN and an ANDSF policy of the second VPLMN, to initiate a data stream offloading operation; and then the UE performs the data stream offloading operation according to an ANDSF policy different from the ANDSF policy that is either the ANDSF policy of the first VPLMN or the ANDSF policy of the second VPLMN and is used to determine to initiate the data stream offloading operation.

12 Claims, 22 Drawing Sheets

(51) Int. Cl.
H04W 36/00 (2009.01)
H04W 84/12 (2009.01)

(56) References Cited

U.S. PATENT DOCUMENTS

| | | | |
|---|---|---|---|
| 2011/0317571 A1 | 12/2011 | Kokkinen et al. | |
| 2012/0149366 A1 | 6/2012 | Mariblanca et al. | |
| 2012/0309447 A1* | 12/2012 | Mustajarvi | H04W 48/18 455/524 |
| 2013/0308527 A1* | 11/2013 | Chin | H04W 36/0022 370/328 |
| 2014/0016629 A1* | 1/2014 | Pancorbo Marcos | H04L 12/5692 370/338 |
| 2014/0092731 A1* | 4/2014 | Gupta | H04W 52/0258 370/229 |
| 2014/0206353 A1* | 7/2014 | Kim | H04W 36/14 455/436 |

FOREIGN PATENT DOCUMENTS

| | | |
|---|---|---|
| CN | 103209440 A | 7/2013 |
| EP | 2501163 A1 | 9/2012 |
| WO | 2010147527 A1 | 12/2010 |
| WO | 2012090401 A1 | 7/2012 |

OTHER PUBLICATIONS

Partial English Translation and Abstract of Chinese Patent Application No. CN103209440, dated Aug. 4, 2015, 5 pages.
"3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)," 3GPP TS 24.234, V11.3.0, Technical Specification, Jun. 2012, 41 pages.
Ericsson, "Key issue for multiple VPLMN," SA WG2 Temporary Document, S2-124059, Oct. 12, 2012, 3 pages.
Jing, Y., et al., "Enhancement of Network Selection Mechanism Between WLAN and Cellular Network Based on ANDSF," China Academic Journal Electronic Publishing House, 1994, 5 pages.
Huawei, "New Key issue: PLMN changes with WLAN consideration during 3GPP interRAT PS handover," SA WG2 Temporary Document, S2-130131, Jan. 28-Feb. 1, 2013, 3 pages.
QUALCOMM, "Revision of key issue 1 for identification of service providers/PLMNs," SA WG2 Temporary Document, S2-130172, Jan. 28-Feb. 1, 2013, 2 pages.
"3rd Generation Partnership Project; Technical Specification Group Services and System Aspects; WLAN Network Selection for 3GPP Terminals; Stage 2 (Release 12)," 3GPP TR 23.865, V0.3.0, Technical Report, Oct. 2012, 12 pages.
Ericsson, "Solution Proposal for Key Issue #6 for multiple V-PLMN," SA WG2 Temporary Document, S2-124270, Nov. 12-16, 2012, 2 pages.
Foreign Communication From a Counterpart Application, Chinese Application No. 201310110289.8, Chinese Search Report dated Apr. 9, 2015, 3 pages.
Foreign Communication From a Counterpart Application, Chinese Application No. 201310110289.8, Chinese Office Action dated Apr. 17, 2015, 3 pages.
Foreign Communication From a Counterpart Application, PCT Application No. PCT/CN2014/072073, English Translation of International Search Report dated Apr. 30, 2014, 2 pages.
Translation Foreign Communication From a Counterpart Application, PCT Application No. PCT/CN2014/072073, English of Written Opinion dated Apr. 30, 2014, 10 pages.

* cited by examiner

NETWORK ACCESS PROCESSING METHOD, AND USER EQUIPMENT

CROSS-REFERENCE TO RELATED APPLICATIONS

This application is a continuation of international Application PCT/CN2014/072073, filed on Feb. 14, 2014, which claims priority to Chinese Patent Application No. 201310052652.5, filed on Feb. 18, 2013 and Chinese Patent Application No. 201310110289.8, filed on Mar. 30, 2013, all of which are hereby incorporated by reference in their entireties.

TECHNICAL FIELD

Embodiments of the present invention relate to communications technologies, and in particular, to a network access processing method, and user equipment.

BACKGROUND

With development of a mobile communications network (a standard is formulated by the 3rd Generation Partnership Project (3GPP)) and a wireless local area network (WLAN), interworking and integration of the two networks receive increasing attention from an operator. In order to implement interworking and integration of a 3GPP access network and a WLAN access network, the 3GPP standardization organization specifies a standard for interworking between the 3GPP access network and the WLAN access network, and defines access network discovery and selection function (ANDSF). The ANDSF provides an access network discovery and selection policy (ANDSF Policy) to a user equipment (UE), and the UE may discover and select a WLAN or 3GPP access network according to the ANDSF Policy so that a part of a data stream accessed through the 3GPP access network is offloaded to the WLAN access network, and offloading of a data stream may also be performed from the WLAN access network to the 3GPP access network so as to prevent network congestion.

However, in a roaming scenario, a case in which the UE simultaneously attaches to (that is, registers with) two different public land mobile networks (PLMN) through the WLAN access network and the 3GPP access network may occur. For example, the UE attaches to a first visited public land mobile network (VPLMN) of an operator 1 using a 3GPP access point 1, and meanwhile attaches, using a WLAN access point 2, to a second VPLMN of an operator 2 or to a home public land mobile network (HPLMN) of an operator to which the UE subscribes. After attaching, the UE may receive an ANDSF Policy from the first VPLMN, and an ANDSF Policy from the second VPLMN or the HPLMN.

Because ANDSF Policies sent by different PLMNs are different, in the roaming scenario, the UE cannot select an access network according to different ANDSF Policies sent by different PLMNs. As a result, a data stream of the UE cannot be offloaded between different access networks of the PLMNs, thereby causing network congestion.

SUMMARY

To overcome the foregoing defect in the prior art that when a roaming UE receives different ANDSF Policies sent by multiple PLMNs, a data stream cannot be offloaded between different access networks of the PLMNs, the present invention provides a network access processing method and UE.

A first aspect of the present invention provides a network access processing method, including, after UE accesses a first VPLMN through a first access network, and accesses a second VPLMN or an HPLMN through a second access network, determining, by the UE according to either ANDSF policy of an ANDSF policy of the first VPLMN and an ANDSF policy of the second VPLMN or the HPLMN, to initiate a data stream offloading operation; and performing, by the UE, the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation.

In a first possible implementation manner of the first aspect of the present invention, the first access network is a 3GPP access network, and the second access network is a WLAN access network, and the determining, by the UE according to either ANDSF policy of an ANDSF policy of the first VPLMN and an ANDSF policy of the second VPLMN or the HPLMN, to initiate a data stream offloading operation includes determining, by the UE according to the ANDSF policy of the first VPLMN, to initiate WLAN offloading; and the performing, by the UE, the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation includes performing, by the UE according to the ANDSF policy of the second VPLMN or the HPLMN, an operation of offloading a data stream to a WLAN access network of the second VPLMN or the HPLMN.

With reference to the first possible implementation manner of the first aspect of the present invention, in a second possible implementation manner, before the performing, by the UE according to the ANDSF policy of the second VPLMN or the HPLMN, an operation of offloading a data stream to a WLAN access network of the second VPLMN or the HPLMN, includes performing, by the UE, WLAN access network discovery and selection according to the ANDSF policy of the first VPLMN, and determining to offload the data stream to the WLAN access network of the second VPLMN; or performing, by the UE, WLAN access network discovery and selection according to the ANDSF policy of the first VPLMN or the HPLMN, and determining to offload the data stream to the WLAN access network of the HPLMN.

With reference to the first possible implementation manner and the second possible implementation manner of the first aspect of the present invention, in a third possible implementation manner, the performing, by the UE according to the ANDSF policy of the second VPLMN or the HPLMN, an operation of offloading a data stream to a WLAN access network of the second VPLMN or the HPLMN includes determining, by the UE according to the ANDSF policy of the second VPLMN or the HPLMN, an offloading manner in which the data stream is transmitted through the WLAN access network; and offloading, by the UE, the data stream to the WLAN access network of the second VPLMN or the HPLMN according to the offloading manner.

With reference to the third possible implementation manner of the first aspect of the present invention, in a fourth possible implementation manner, the offloading manner includes transmitting a part or all of the data stream through the WLAN access network of the second VPLMN or the HPLMN in a non-seamless WLAN offloading manner; or transmitting a part or all of the data stream through the WLAN access network of the second VPLMN or the HPLMN in a seamless WLAN offloading manner; or transmitting a part of the data stream through the WLAN access network of the second VPLMN or the HPLMN in a non-seamless WLAN offloading manner, and transmitting the other part of the data stream through the WLAN access network of the second VPLMN or the HPLMN in a seamless WLAN offloading manner.

In a fifth possible implementation manner of the first aspect of the present invention, the first access network is a 3GPP access network, and the second access network is a WLAN access network, and the determining, by the UE according to either ANDSF policy of an ANDSF policy of the first VPLMN and an ANDSF policy of the second VPLMN or the HPLMN, to initiate a data stream offloading operation includes determining, by the UE according to the ANDSF policy of the second VPLMN or the HPLMN, to offload a data stream from the WLAN access network to the 3GPP access network; and the performing, by the UE, the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation includes performing, by the UE according to the ANDSF policy of the first VPLMN, an operation of offloading the data stream to a 3GPP access network of the first VPLMN.

With reference to the fifth possible implementation manner of the first aspect of the present invention, in a sixth possible implementation manner, before the performing, by the UE according to the ANDSF policy of the first VPLMN, an operation of offloading the data stream to a 3GPP access network of the first VPLMN, the method includes performing, by the UE, 3GPP access network discovery and selection according to the ANDSF policy of the second VPLMN or the HPLMN, and determining to offload the data stream to the 3GPP access network of the first VPLMN.

With reference to the fifth possible implementation manner and the sixth possible implementation manner of the first aspect of the present invention, in a seventh possible implementation manner, the performing, by the UE according to the ANDSF policy of the first VPLMN, an operation of offloading the data stream to a 3GPP access network of the first VPLMN includes determining, by the UE according to the ANDSF policy of the first VPLMN, whether the data stream can be transmitted through the 3GPP access network, and if the data stream can be transmitted through the 3GPP access network, offloading, by the UE, the data stream to the 3GPP access network of the first VPLMN.

With reference to the first aspect of the present invention or the foregoing possible implementation manners of the first aspect, in an eighth possible implementation manner, the determining, by the UE according to either ANDSF policy of an ANDSF policy of the first VPLMN and an ANDSF policy of the second VPLMN or the HPLMN, to initiate a data stream offloading operation includes determining, by the UE according to an inter-system routing policy (ISRP) in the one ANDSF policy, to initiate the data stream offloading operation; and the performing, by the UE, the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation includes performing, by the UE, the data stream offloading operation according to an ISRP in the ANDSF policy different from the ANDSF policy that is used to determine to initiate the data stream offloading operation.

A second aspect of the present invention provides UE, including an accessing module configured to access a first VPLMN through a first access network, and access a second VPLMN through a second access network, or configured to access a first VPLMN through a first access network, and access an HPLMN through a second access network; an offloading triggering module configured to determine, according to either ANDSF policy of an ANDSF policy of the first VPLMN and an ANDSF policy of the second VPLMN, to initiate a data stream offloading operation; or configured to determine, according to either ANDSF policy of an access network discovery and selection function ANDSF policy of the first VPLMN and an ANDSF policy of the HPLMN, to initiate a data stream offloading operation; and an offloading processing module configured to perform the data stream offloading operation according to an ANDSF policy different from the ANDSF policy that is either the ANDSF policy of the first VPLMN or the ANDSF policy of the second VPLMN and is used to determine to initiate the data stream offloading operation, or configured to perform the data stream offloading operation according to an ANDSF policy different from the ANDSF policy that is either the ANDSF policy of the first VPLMN or the ANDSF policy of the HPLMN and is used to determine to initiate the data stream offloading operation.

In a first possible implementation manner of the second aspect of the present invention, the offloading triggering module includes a first triggering unit configured to determine, according to the ANDSF policy of the first VPLMN, to initiate WLAN offloading; and the offloading processing module includes a first offloading executing unit configured to perform, according to the ANDSF policy of the second VPLMN, an operation of offloading a data stream to a WLAN access network of the second VPLMN; or configured to offload a data stream to a WLAN access network of the HPLMN according to the ANDSF policy of the HPLMN.

With reference to the first possible implementation manner of the second aspect of the present invention, in a second possible implementation manner, the offloading triggering module further includes a first determining unit configured to perform WLAN access network discovery and selection according to the ANDSF policy of the first VPLMN, and determine to offload the data stream to either a WLAN access network of the first VPLMN or the WLAN access network of the second VPLMN; or configured to determine to offload the data stream to either a WLAN access network of the first VPLMN or the WLAN access network of the HPLMN.

With reference to the first possible implementation manner and the second possible implementation manner of the second aspect of the present invention, in a third possible implementation manner, the first offloading executing unit is configured to determine, according to the ANDSF policy of the second VPLMN, an offloading manner in which the data stream is transmitted through the WLAN access network; or configured to determine, according to the ANDSF policy of the HPLMN, an offloading manner in which the data stream is transmitted through the WLAN access network; and the first offloading executing unit is further configured to offload the data stream to the WLAN access network of the second VPLMN according to the offloading manner, or further configured to offload the data stream to the WLAN access network of the HPLMN according to the offloading manner.

With reference to the third possible implementation manner of the second aspect of the present invention, in a fourth possible implementation manner, the offloading manner includes transmitting a part or all of the data stream through the WLAN access network of the second VPLMN or the HPLMN in a non-seamless WLAN offloading manner; or transmitting a part or all of the data stream through the WLAN access network of the second VPLMN or the HPLMN in a seamless WLAN offloading manner; or transmitting a part of the data stream through the WLAN access network of the second VPLMN or the HPLMN in a non-seamless WLAN offloading manner, and transmitting the other part of the data stream through the WLAN access network of the second VPLMN or the HPLMN in a seamless WLAN offloading manner.

In a fifth possible implementation manner of the second aspect of the present invention, the offloading triggering module includes a second triggering unit further configured to determine, according to the ANDSF policy of the second VPLMN, to offload a data stream from a WLAN access network to a 3GPP access network; or configured to determine, according to the ANDSF policy of the HPLMN, to offload a data stream from a WLAN access network to a 3GPP access network; and the offloading processing module specifically includes a second offloading executing unit configured to perform, according to the ANDSF policy of the first VPLMN, an operation of offloading the data stream to a 3GPP access network of the first VPLMN.

With reference to the fifth possible implementation manner of the second aspect of the present invention, in a sixth possible implementation manner, the offloading triggering module further includes a second determining unit configured to perform 3GPP access network discovery and selection according to the ANDSF policy of the second VPLMN, and determine to offload the data stream to either the 3GPP access network of the first VPLMN or a 3GPP access network of the second VPLMN; or configured to determine to offload the data stream to either the 3GPP access network of the first VPLMN or a 3GPP access network of a third VPLMN.

With reference to the fifth possible implementation manner and the sixth possible implementation manner of the second aspect of the present invention, in a seventh possible implementation manner, the second offloading executing unit is configured to determine, according to the ANDSF policy of the first VPLMN, whether the data stream can be transmitted through the 3GPP access network; and if the data stream can be transmitted through the 3GPP access network, the second offloading executing unit offloads the data stream to the 3GPP access network of the first VPLMN.

With reference to the foregoing possible implementation manners of the second aspect of the present invention, in an eighth possible implementation manner, the offloading triggering module is configured to determine, according to an ISRP in the one ANDSF policy, to initiate the data stream offloading operation; and the offloading processing module is configured to perform the data stream offloading operation according to an ISRP in the ANDSF policy different from the ANDSF policy that is used to determine to initiate the data stream offloading operation.

According to the network access processing method and the UE that are provided in embodiments of the present invention, after the UE accesses a first VPLMN through a first access network, and accesses a second VPLMN or an HPLMN through a second access network, the UE determines, according to either ANDSF policy of an ANDSF policy of the first VPLMN and an ANDSF policy of the second VPLMN or the HPLMN, to initiate a data stream offloading operation; and then the UE performs the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation. It is effectively ensured that, in a roaming scenario, after the UE receives ANDSF policies corresponding to different PLMNs, the UE cooperatively implements, according to different ANDSF policies, an operation of offloading a data stream between a 3GPP access network and a WLAN access network that are of different PLMNs, thereby improving utilization of a network resource, and reducing network congestion.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention.

Figure 1:
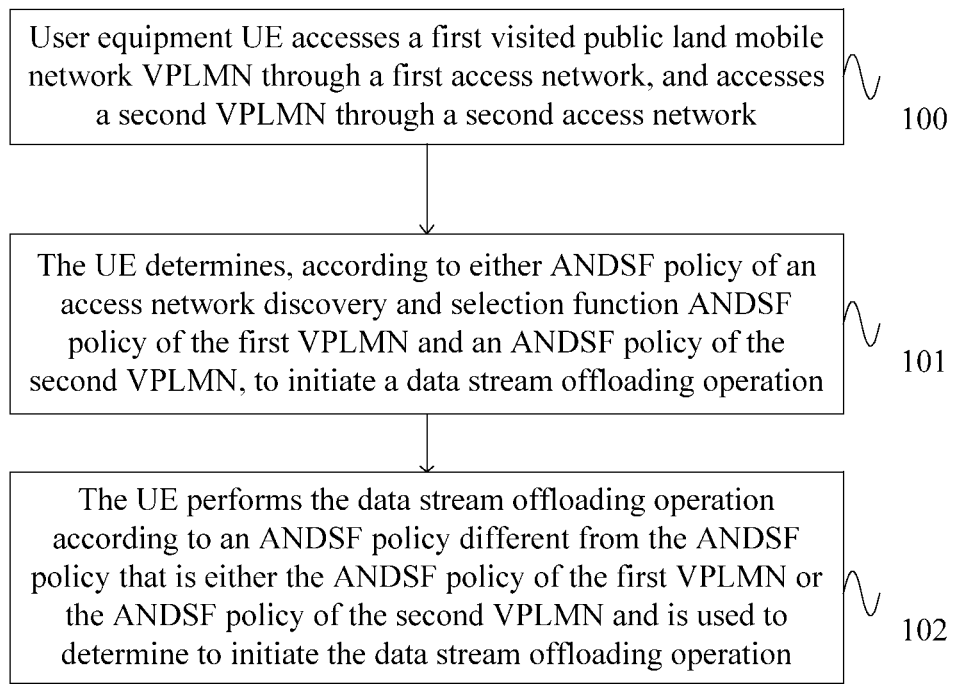
FIG. 1 is a flowchart of a first network access processing method according to an embodiment of the present invention.

FIG. 1 is a flowchart of a first network access processing method according to an embodiment of the present invention. FIG. 1 includes the following steps.

Step 100: UE accesses a first VPLMN through a first access network, and accesses a second VPLMN through a second access network.

Step 101: The UE determines, according to either ANDSF policy of an ANDSF policy of the first VPLMN and an ANDSF policy of the second VPLMN, to initiate a data stream offloading operation.

In a roaming scenario, the UE may access the first VPLMN through the first access network, and access the second VPLMN through the second access network. In addition, ANDSF that belongs to the first VPLMN sends the ANDSF policy of the first VPLMN to the UE, and ANDSF that belongs to the second VPLMN sends the ANDSF policy of the second VPLMN to the UE. The foregoing ANDSF policies include information indicating which data stream may undergo an offloading operation between the first access network and the second access network, for example, which data stream can be transmitted or is preferentially transmitted on the first access network, and which data stream that can be transmitted or is preferentially transmitted on the second access network. When the ANDSF policy of the first VPLMN and the ANDSF policy of the second VPLMN include information used for an offloading operation, which may be performed between the first access network and the second access network, on at least one data stream, the UE may initiate the offloading operation according to the ANDSF policy of the first VPLMN or the ANDSF policy of the second VPLMN.

In addition, it should be noted that, the UE may perform step 101 after accessing the first VPLMN through the first access network and accessing the second VPLMN through the second access network in step 100. Alternatively, in step 100, the UE may access the first VPLMN through the first access network, and in this case, the UE may directly determine, according to the ANDSF policy of the first VPLMN, to initiate the data stream offloading operation. Then, the UE accesses the second VPLMN through the second access network, receives the ANDSF policy of the second VPLMN, and performs the data stream offloading operation. Similarly, the UE may also first access the second VPLMN through the second access network, and then access the first VPLMN through the first access network.

Step 102: The UE performs the data stream offloading operation according to an ANDSF policy different from the ANDSF policy that is either the ANDSF policy of the first VPLMN or the ANDSF policy of the second VPLMN and is used to determine to initiate the data stream offloading operation.

If the UE initiates the offloading operation according to the ANDSF policy of the first VPLMN, the UE performs the offloading operation according to the ANDSF policy of the second VPLMN. If the UE initiates the offloading operation according to the ANDSF policy of the second VPLMN, the UE performs the offloading operation according to the ANDSF policy of the first VPLMN. Generally, the first VPLMN and the second VPLMN belong to different operators.

According to the network access processing method provided in this embodiment, UE accesses a first VPLMN through a first access network, and accesses a second VPLMN through a second access network; the UE determines, according to either ANDSF policy of an ANDSF policy of the first VPLMN and an ANDSF policy of the second VPLMN, to initiate a data stream offloading operation; then the UE performs the data stream offloading operation according to an ANDSF policy different from the ANDSF policy that is either the ANDSF policy of the first VPLMN or the ANDSF policy of the second VPLMN and is used to determine to initiate the data stream offloading operation. It is effectively ensured that, in a roaming scenario, after the UE receives ANDSF policies corresponding to different VPLMNs, the UE cooperatively implements, according to different ANDSF policies, an operation of offloading a data stream between a 3GPP access network and a WLAN access network that are of different VPLMNs, thereby improving utilization of a network resource, and reducing network congestion.

It should be noted that a WLAN access network of a PLMN in this embodiment of the present invention refers to a WLAN access network indicated in an ANDSF policy of the PLMN, and may include a WLAN access network deployed by an operator of the PLMN, a WLAN access network deployed by an operator or an organization (such as an enterprise or a school) that has a roaming cooperation relationship with the operator of the PLMN, a WLAN access network that can interwork with the PLMN, and the like.

Figure 2:
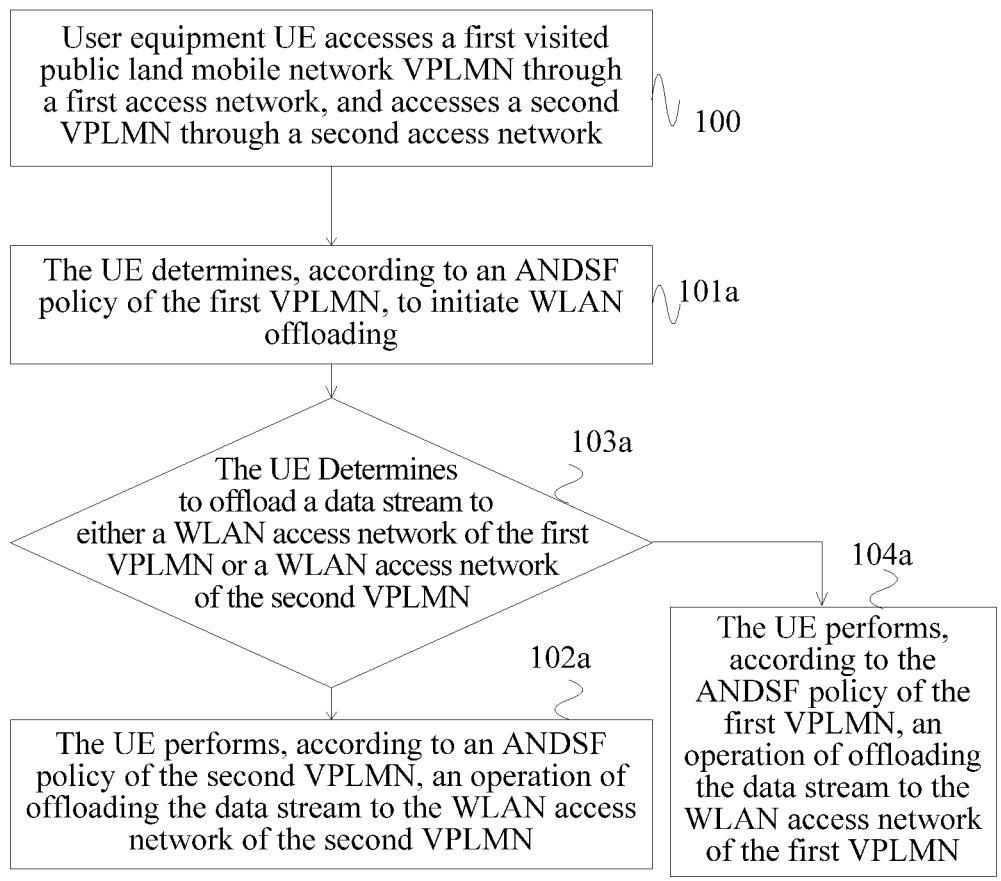
FIG. 2 is a flowchart of a second network access processing method according to an embodiment of the present invention.

On the basis of FIG. 1, further, FIG. 2 is a flowchart of a second network access processing method according to an embodiment of the present invention. Referring to FIG. 2, in a scenario in which the first access network is a 3GPP access network, the second access network is a WLAN access network, and a data stream is offloaded from the 3GPP access network to the WLAN access network, the foregoing step 101 in FIG. 1, that is, the UE determines, according to either ANDSF policy of an ANDSF policy of the first VPLMN and an ANDSF policy of the second VPLMN, to initiate a data stream offloading operation, includes the following step.

Step 101a: The UE determines, according to the ANDSF policy of the first VPLMN, to initiate WLAN offloading.

The WLAN offloading is that the data stream is offloaded (that is, transferred and switched) from the 3GPP access network to the WLAN access network.

Referring to FIG. 2, the foregoing step 102 in FIG. 1, that is, the UE performs the data stream offloading operation according to an ANDSF policy different from the ANDSF policy that is either the ANDSF policy of the first VPLMN or the ANDSF policy of the second VPLMN and is used to determine to initiate the data stream offloading operation, includes the following step.

Step 102a: The UE performs, according to the ANDSF policy of the second VPLMN, an operation of offloading a data stream to a WLAN access network of the second VPLMN.

The WLAN access network of the second VPLMN refers to a WLAN access network indicated in the ANDSF policy of the second VPLMN, and may include a WLAN access network deployed by an operator of the second VPLMN, a WLAN access network deployed by an operator or an organization (such as an enterprise or a school) that has a roaming cooperation relationship with the operator of the second VPLMN, a WLAN access network that can interwork with the second VPLMN, and the like. In this way, using step 101a and step 102a, in a roaming scenario, it may be effectively ensured that the UE cooperatively implements, according to the ANDSF policy of the first VPLMN and the ANDSF policy of the second VPLMN, an operation of offloading a data stream from a 3GPP access network to a WLAN access network, where the 3GPP access network and the WLAN access network are of different VPLMNs, thereby improving utilization of a network resource, and reducing network congestion.

Further, referring to FIG. 2, in step 101a, before the UE offloads the data stream to the WLAN access network of the second VPLMN according to the ANDSF policy of the second VPLMN, further includes the following steps.

Step 103a: The UE determines to offload the data stream to either a WLAN access network of the first VPLMN or the WLAN access network of the second VPLMN.

If the UE determines to offload the data stream to the WLAN access network of the second VPLMN, step 102a is performed. If the UE determines to offload the data stream to the WLAN access network of the first VPLMN, step 104a is performed. Therefore, an offloading success rate may be improved so as to ensure that the data stream is offloaded to a WLAN access network whose network environment is relatively good and ensure transmission quality of the data stream.

Step 104a: The UE performs, according to the ANDSF policy of the first VPLMN, an operation of offloading the data stream to the WLAN access network of the first VPLMN.

Step 103a, that is, the UE determines to offload the data stream to either a WLAN access network of the first VPLMN or the WLAN access network of the second VPLMN, includes that the UE performs WLAN access network discovery and selection according to the ANDSF policy of the first VPLMN, and determines to offload the data stream to either the WLAN access network of the first VPLMN or the WLAN access network of the second VPLMN.

Preferably, the UE performs WLAN access network discovery and selection according to the ANDSF policy of the first VPLMN, and determines to offload the data stream to the WLAN access network of the second VPLMN so that it is implemented that the data stream is offloaded to an accessed WLAN access network to be transmitted. Optionally, the UE performs WLAN access network discovery and selection according to the ANDSF policy of the first VPLMN, and determines to offload the data stream to the WLAN access network of the first VPLMN.

Further, in the foregoing network access processing method, step 102a, that is, the UE performs, according to the ANDSF policy of the second VPLMN, an operation of offloading a data stream to a WLAN access network of the second VPLMN, includes that the UE determines, according to the ANDSF policy of the second VPLMN, an offloading manner in which the data stream is transmitted through the WLAN access network; and the UE offloads the data stream to the WLAN access network of the second VPLMN according to the offloading manner.

When offloading is performed from the 3GPP access network to the WLAN access network, the offloading manner may include seamless offloading and non-seamless offloading. Non-seamless offloading is that the data stream directly accesses a service network through the WLAN access network, and seamless offloading is that the data stream accesses a 3GPP core network through the WLAN access network, and further accesses a service network using the 3GPP core network. In addition, a part or all of the data stream is transmitted through the WLAN access network of the second VPLMN in a non-seamless WLAN offloading manner. Alternatively, a part or all of the data stream is transmitted through the WLAN access network of the second VPLMN in a seamless WLAN offloading manner. Alternatively, a part of the data stream is transmitted through the WLAN access network of the second VPLMN in a non-seamless WLAN offloading manner, and the other part of the data stream is transmitted through the WLAN access network of the second VPLMN in a seamless WLAN offloading manner.

Further, before the offloading, by the UE, the data stream to the WLAN access network of the second VPLMN according to the offloading manner, further includes determining, by the UE according to the ANDSF policy of the second VPLMN, whether the data stream can be transmitted through the WLAN access network, and if the data stream can be transmitted through the WLAN access network, performing the step of offloading, by the UE, the data stream to the WLAN access network of the second VPLMN according to the offloading manner.

The UE determines, according to the ANDSF policy of the second VPLMN, whether the data stream can be transmitted through the WLAN access network. For example, the UE determines, according to the ANDSF policy of the second VPLMN, whether the data stream can be offloaded to the WLAN access network of the second VPLMN in a non-seamless offloading or seamless offloading manner. If normal transmission of the data stream can be ensured after the offloading, the step of offloading, by the UE, the data stream to the WLAN access network of the second VPLMN according to the offloading manner is performed.

Figure 3:
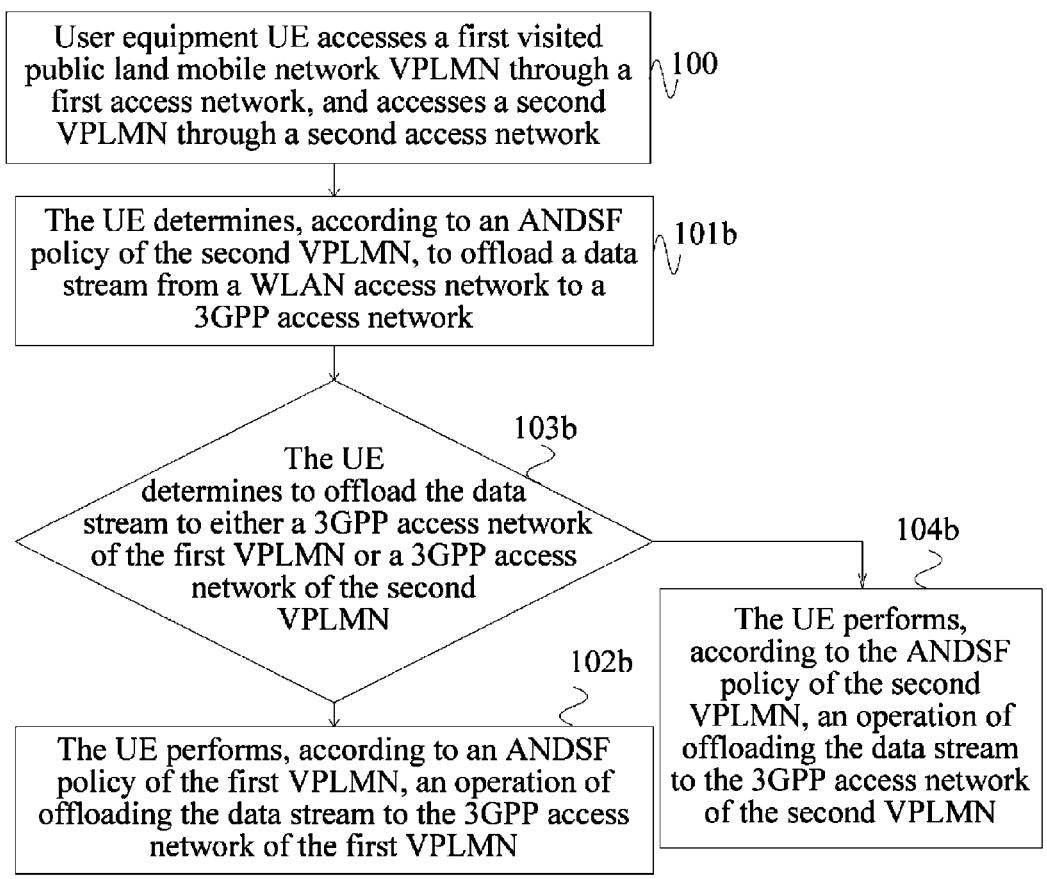
FIG. 3 is a flowchart of a third network access processing method according to an embodiment of the present invention.

On the basis of FIG. 1, further, FIG. 3 is a flowchart of a third network access processing method according to an embodiment of the present invention. Referring to FIG. 3, in a scenario in which the first access network is a 3GPP access network, the second access network is a WLAN access network, and a data stream is offloaded from the WLAN access network to the 3GPP access network, the foregoing step 101 in FIG. 1, that is, the UE determines, according to either ANDSF policy of an ANDSF policy of the first VPLMN and an ANDSF policy of the second VPLMN, to initiate a data stream offloading operation, includes the following step.

Step 101b: The UE determines, according to the ANDSF policy of the second VPLMN, to offload a data stream from a WLAN access network to a 3GPP access network.

Referring to FIG. 3, step 102 in FIG. 1, that is, the UE performs the data stream offloading operation according to an ANDSF policy different from the ANDSF policy that is either the ANDSF policy of the first VPLMN or the ANDSF policy of the second VPLMN and is used to determine to initiate the data stream offloading operation, includes the following step.

Step 102b: The UE performs, according to the ANDSF policy of the first VPLMN, an operation of offloading the data stream to a 3GPP access network of the first VPLMN.

Further, referring to FIG. 3, before step 102b, that is, the UE offloads the data stream to a 3GPP access network of the first VPLMN according to the ANDSF policy of the first VPLMN, further includes the following steps.

Step 103b: The UE determines to offload the data stream to either the 3GPP access network of the first VPLMN or a 3GPP access network of the second VPLMN.

If the UE determines to offload the data stream to the 3GPP access network of the first VPLMN, step 102b is performed. If the UE determines to offload the data stream to the 3GPP access network of the second VPLMN, step 104b is performed. In this way, using step 101b and step 102b, in a roaming scenario, it may be effectively ensured that the UE cooperatively implements, according to the ANDSF policy of the first VPLMN and the ANDSF policy of the second VPLMN, an operation of offloading a data stream from a WLAN access network to a 3GPP access network, where the WLAN access network and the 3GPP access network are of different VPLMNs, thereby improving utilization of a network resource, and reducing network congestion.

Step 104b: The UE performs, according to the ANDSF policy of the second VPLMN, an operation of offloading the data stream to the 3GPP access network of the second VPLMN.

Step 103b, that is, the UE determines to offload the data stream to either the 3GPP access network of the first VPLMN or a 3GPP access network of the second VPLMN, includes that the UE performs 3GPP access network discovery and selection according to the ANDSF policy of the second VPLMN, and determines to offload the data stream to either the 3GPP access network of the first VPLMN or the 3GPP access network of the second VPLMN.

Preferably, the UE performs 3GPP access network discovery and selection according to the ANDSF policy of the second VPLMN, and determines to offload the data stream to the 3GPP access network of the first VPLMN so that it is implemented that the data stream is offloaded to an accessed 3GPP access network to be transmitted. Optionally, the UE performs 3GPP access network discovery and selection according to the ANDSF policy of the second VPLMN, and determines to offload the data stream to the 3GPP access network of the second VPLMN.

Further, in the foregoing network access processing method, step 102b, that is, the UE performs, according to the ANDSF policy of the first VPLMN, an operation of offloading the data stream to a 3GPP access network of the first VPLMN, includes that the UE determines, according to the ANDSF policy of the first VPLMN, whether the data stream can be transmitted through the 3GPP access network, and if the data stream can be transmitted through the 3GPP access network, offloads, by the UE, the data stream to the 3GPP access network of the first VPLMN.

Further, in the foregoing network access processing method, whether offloading is performed from the 3GPP access network to the WLAN access network or from the WLAN access network to the 3GPP access network, step 101 in FIG. 1, that is, the UE determines, according to either ANDSF policy of an ANDSF policy of the first VPLMN and an ANDSF policy of the second VPLMN, to initiate a data stream offloading operation, includes that the UE determines, according to an ISRP in the ANDSF policy, to initiate the data stream offloading operation.

Step 102 in FIG. 1, that is, the UE performs the data stream offloading operation according to an ANDSF policy different from the ANDSF policy that is either the ANDSF policy of the first VPLMN or the ANDSF policy of the second VPLMN and is used to determine to initiate the data stream offloading operation includes that the UE performs the data stream offloading operation according to an ISRP in the ANDSF policy different from the ANDSF policy that is used to determine to initiate the data stream offloading operation.

Figure 4:
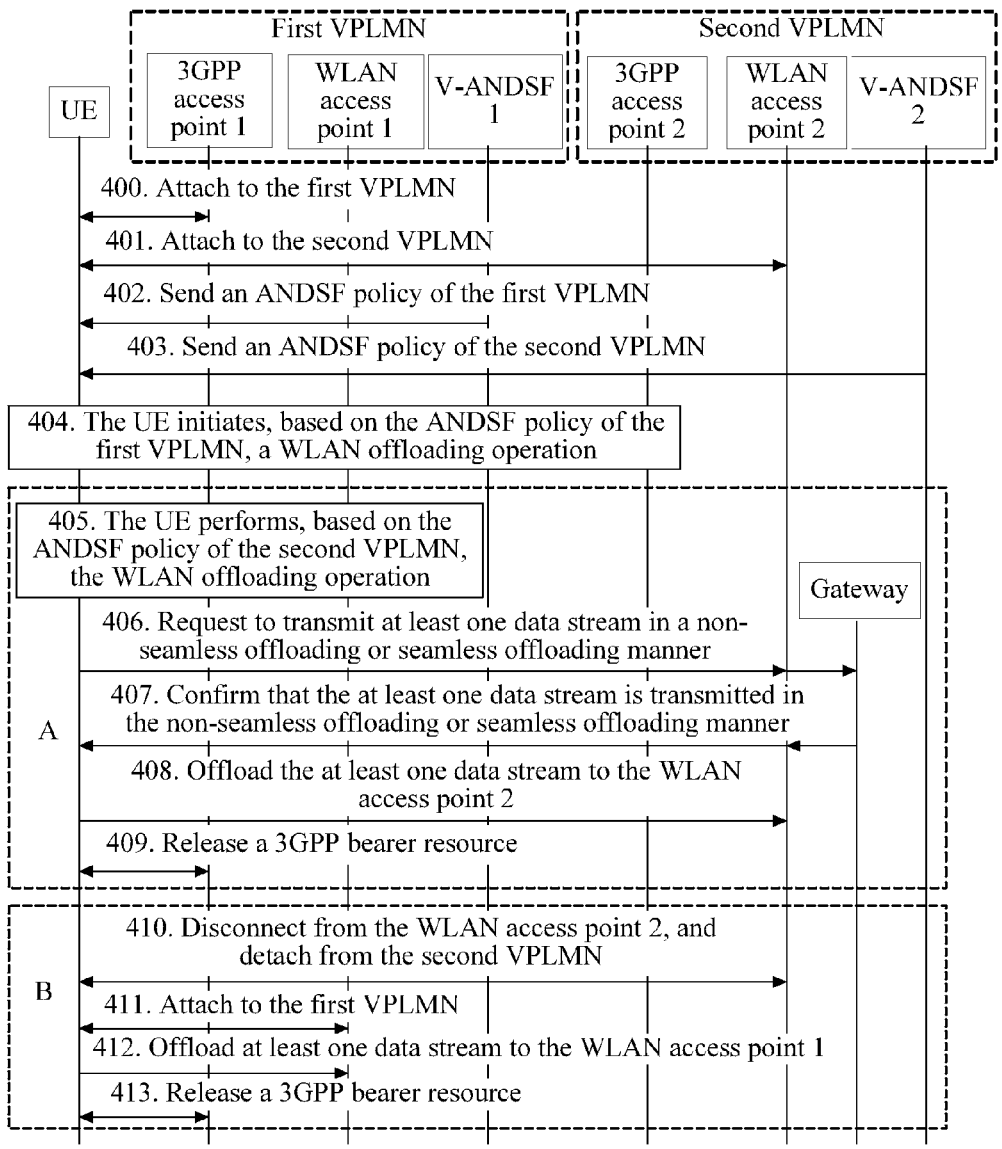
FIG. 4 is a signaling flowchart of a fourth network access processing method according to an embodiment of the present invention.

FIG. 4 is a signaling flowchart of a fourth network access processing method according to an embodiment of the present invention. Referring to FIG. 4, the following describes a scenario in which a data stream is offloaded from a 3GPP access network to a WLAN access network. Steps are as follows.

Step 400: UE attaches to a first VPLMN using a 3GPP access point 1.

The 3GPP access point 1 may be a cell of the 3GPP access network, and the cell may be identified by a cell identification (ID) in an ANDSF policy.

Step 401: The UE attaches to a second VPLMN using a WLAN access point 2.

The WLAN access point 2 may be an access point or a hotspot of the WLAN access network, and is identified by a service set identifier (SSID), a basic service set identifier (BSSID), and/or a homogenous extended service set identifier (HESSID), and/or the like in an ANDSF policy.

Step 402: V-ANDSF1 to which the first VPLMN belongs sends an ANDSF policy of the first VPLMN to the UE.

Step 403: V-ANDSF2 to which the second VPLMN belongs sends an ANDSF policy of the second VPLMN to the UE.

Step 404: The UE initiates, based on the ANDSF policy of the first VPLMN, a WLAN offloading operation.

The UE determines, based on an ISRP in the ANDSF policy of the first VPLMN, to initiate an offloading operation. If the ISRP includes a correspondence between one or more data streams and the WLAN access network, it indicates that the one or more data streams may be offloaded to the WLAN access network.

Step 405: The UE performs, based on the ANDSF policy of the second VPLMN, the WLAN offloading operation.

If the UE determines to offload a data stream to the WLAN access point 2 of the second VPLMN, steps 405-409 in block A are performed. The UE determines, based on an ISRP in the ANDSF policy of the second VPLMN, which data stream can be offloaded to the WLAN access point 2 to be transmitted, specifically, which data stream is transmitted using the WLAN access point 2 in a non-seamless offloading manner and which data stream that is transmitted using the WLAN access point 2 in a seamless offloading manner; and which data stream is not allowed to be transmitted using the WLAN access point 2. For the data stream that cannot be offloaded to the WLAN access point 2 to be transmitted, according to a configuration of the UE, an operator policy, a network condition, and the like, the UE releases the data stream or continues to transmit using the 3GPP access point 1.

Step 406: The UE requests, using the WLAN access point 2, a gateway to transmit at least one data stream in a non-seamless offloading or seamless offloading manner.

The gateway may be a WLAN gateway or a packet data network gateway (PDN GW), where the WLAN gateway includes a trusted WLAN access gateway (TWAG), a non-trusted WLAN access gateway, or the like.

Step 407: The gateway confirms, using the WLAN access point 2, with the UE that the at least one data stream is transmitted in the non-seamless offloading or seamless offloading manner.

The WLAN gateway or the PDN GW accepts the request of the UE, and allows the data stream in the request to be offloaded in a corresponding offloading manner to be transmitted. It should be noted that the PDN GW may further allow, according to a current network condition such as network load or a congestion condition, that the offloading operation is performed on only a part of the data stream in the request and even refuse to perform the offloading operation on the data stream in the request.

Step 408: The UE offloads the at least one data stream to the WLAN access point 2.

The UE offloads, to the WLAN access point 2, the data stream that the PDN GW allows to be offloaded.

Step 409: The UE releases a 3GPP bearer resource.

For the data stream offloaded to the WLAN access point 2 to be transmitted, the UE or a network device, for example, the PDN GW, may initiate release of a bearer resource that is at the 3GPP access point 1 and corresponding to the data stream. For the data stream that cannot be offloaded to the WLAN access point 2 to be transmitted, according to the configuration of the UE, the operator policy, the network condition, and the like, the UE releases the data stream or reserves the data stream at the 3GPP access point 1.

Optionally, if the UE determines to offload a data stream to a WLAN access network of the first VPLMN, steps in block B are performed.

Step 410: The UE disconnects from the WLAN access point 2, and detaches from the second VPLMN.

Step 411: The UE attaches to the first VPLMN using a WLAN access point 1.

Step 412: The UE offloads at least one data stream to the WLAN access point 1.

The UE determines, according to the ISRP in the ANDSF policy of the first VPLMN, whether a to-be-offloaded data stream is transmitted using the WLAN access point 1 in a seamless offloading or non-seamless offloading manner, and after determining an offloading manner, offloads the to-be-offloaded data stream to the WLAN access point 1.

Step 413: The UE releases a 3GPP bearer resource.

For the data stream offloaded to the WLAN access point 1 to be transmitted, the UE or the network device, for example, the PDN GW, may initiate release of the bearer resource at the 3GPP access point 1.

Figure 5A:
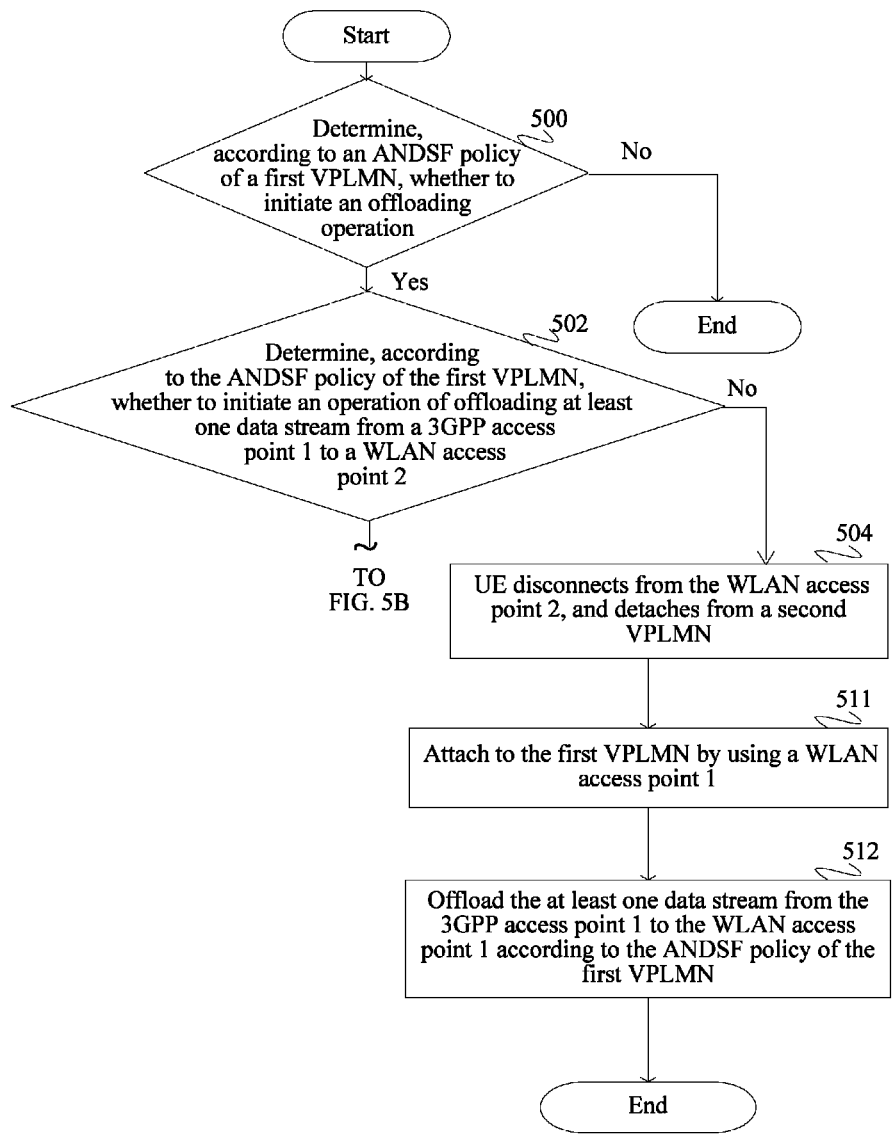
FIG. 5A and FIG. 5B are a decision flowchart of a fourth network access processing method according to an embodiment of the present invention.
Figure 5B:
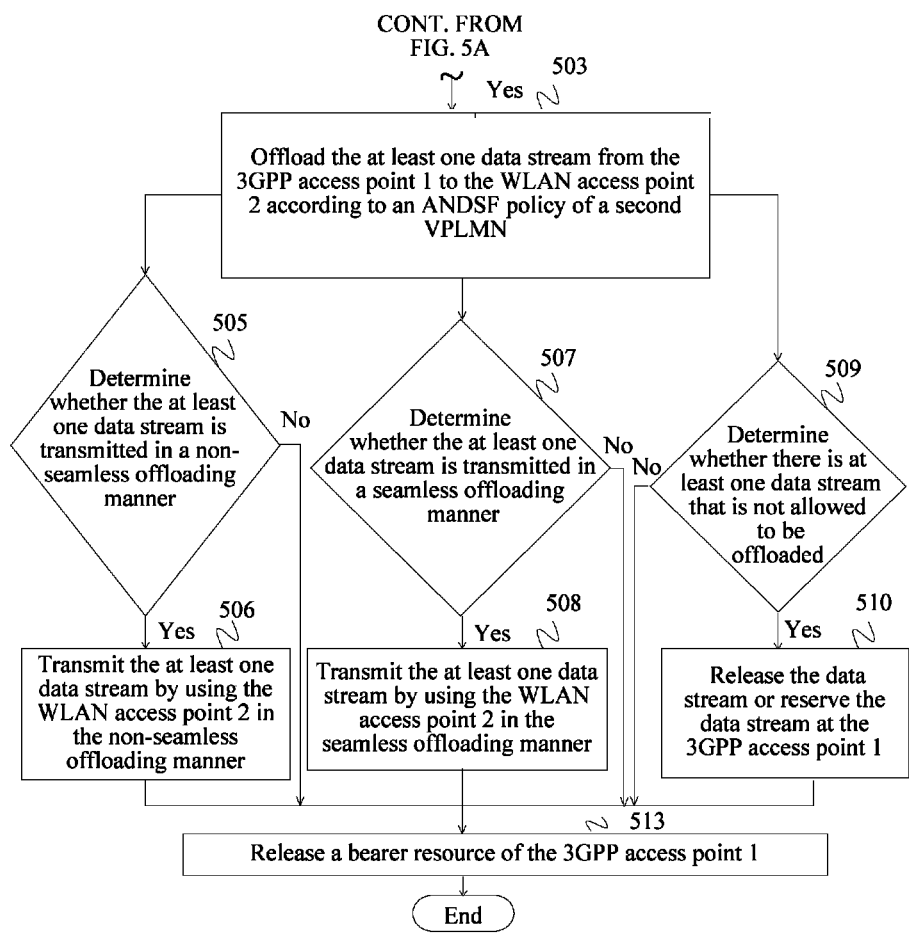

On the basis of FIG. 4, FIG. 5A and FIG. 5B are a decision flowchart of a fourth network access processing method according to an embodiment of the present invention, and steps are as follows.

Step 500: Determine, according to an ANDSF policy of a first VPLMN, whether to initiate an offloading operation.

Referring to step 404 in FIG. 4, in step 500, UE determines, according to the ANDSF policy of the first VPLMN, whether to initiate the offloading operation. If the UE determines to initiate the offloading operation, step 502 is performed; if the UE does not determine to initiate the offloading operation, the process ends. Optionally, the ANDSF policy of the first VPLMN may include a correspondence between at least one data stream and a WLAN access point 1, or includes a correspondence between at least one data stream and a WLAN access point 1 and a correspondence between at least one data stream and a WLAN access point 2. That is, a WLAN offloading operation is initiated and step 502 is performed, provided that the ANDSF policy of the first VPLMN includes a correspondence between at least one data stream and a WLAN access point.

Step 502: Determine, according to the ANDSF policy of the first VPLMN, whether to initiate an operation of offloading at least one data stream from a 3GPP access point 1 to a WLAN access point 2.

The UE determines, according to the ANDSF policy of the first VPLMN, whether to initiate the operation of offloading the at least one data stream from the 3GPP access point 1 to the WLAN access point 2. If the UE determines to initiate the operation of offloading the at least one data stream from the 3GPP access point 1 to the WLAN access point 2, step 503 is performed. In step 502, if the UE determines, according to the ANDSF policy of the first VPLMN, that the operation of offloading the at least one data stream from the 3GPP access point 1 to the WLAN access point 2 cannot be initiated, optionally, the UE performs WLAN discovery and selection according to the ANDSF policy of the first VPLMN. If preferably selecting a new WLAN access point 1 includes discovering the WLAN access point 1, which has a higher priority, of the first VPLMN, step 504 is performed. It should be noted that, when a WLAN access point that has a higher priority does not belong to the first VPLMN but belongs to another VPLMN, step 504 may also be performed so that the UE attaches to the foregoing another VPLMN using the new WLAN access point that has a higher priority, so as to implement WLAN offloading.

Step 503: Offload the at least one data stream from the 3GPP access point 1 to the WLAN access point 2 according to an ANDSF policy of a second VPLMN.

Referring to step 405 in FIG. 4, the offloading, by the UE, the at least one data stream from the 3GPP access point 1 to the WLAN access point 2 according to an ANDSF policy of a second VPLMN has three possible cases. Case 1: When the UE determines, according to the ANDSF policy of the second VPLMN, that the at least one data stream is offloaded in a non-seamless offloading manner, step 505 is correspondingly performed. Case 2: When the UE determines, according to the ANDSF policy of the second VPLMN, that the at least one data stream is offloaded in a seamless offloading manner, step 507 is correspondingly performed. Case 3: When the UE determines, according to the ANDSF policy of the second VPLMN, that the at least one data stream is not allowed to be offloaded, step 509 is correspondingly performed.

Step 504: UE disconnects from the WLAN access point 2, and detaches from the second VPLMN.

Referring to step 410 in FIG. 4, the detaching from the second PLMN is that the UE deregisters from the second VPLMN.

Step 505: Determine whether the at least one data stream is transmitted in a non-seamless offloading manner.

In Case 1 of step 503, the UE determines, according to the ANDSF policy of the second VPLMN, that the at least one data stream is offloaded in the non-seamless offloading manner, and the UE transmits the at least one data stream in the non-seamless offloading manner.

Step 506: Transmit the at least one data stream using the WLAN access point 2 in the non-seamless offloading manner.

Step 507: Determine whether the at least one data stream is transmitted in a seamless offloading manner.

The UE determines, according to the ANDSF policy of the second VPLMN, that the at least one data stream is transmitted in the seamless offloading manner, and the UE transmits the at least one data stream in the seamless offloading manner.

Step 508: Transmit the at least one data stream using the WLAN access point 2 in the seamless offloading manner.

Step 509: Determine whether there is at least one data stream that is not allowed to be offloaded.

In Case 3 of step 503, the UE determines, according to the ANDSF policy of the second VPLMN, that the at least one data stream is not allowed to be offloaded, and the UE does not allow the at least one data stream to be offloaded.

Step 510: Release the data stream or reserve the data stream at the 3GPP access point 1.

For the data stream that cannot be offloaded to the WLAN access point 2 to be transmitted, according to a configuration of the UE, an operator policy, a network condition, and the like, the UE releases the data stream or reserves the data stream at the 3GPP access point 1.

Step 511: Attach to the first VPLMN using a WLAN access point 1.

Referring to step 411 in FIG. 4, after step 504 is performed, the UE attaches to the first VPLMN using the WLAN access point 1.

Step 512: Offload the at least one data stream from the 3GPP access point 1 to the WLAN access point 1 according to the ANDSF policy of the first VPLMN.

Referring to step 412 in FIG. 4, the UE offloads the at least one data stream from the 3GPP access point 1 to the WLAN access point 1 according to the ANDSF policy of the first VPLMN.

Step 513: Release a bearer resource of the 3GPP access point 1.

Referring to step 409 and step 413 in FIG. 4, the UE releases the bearer resource of the 3GPP access point 1.

Figure 6:
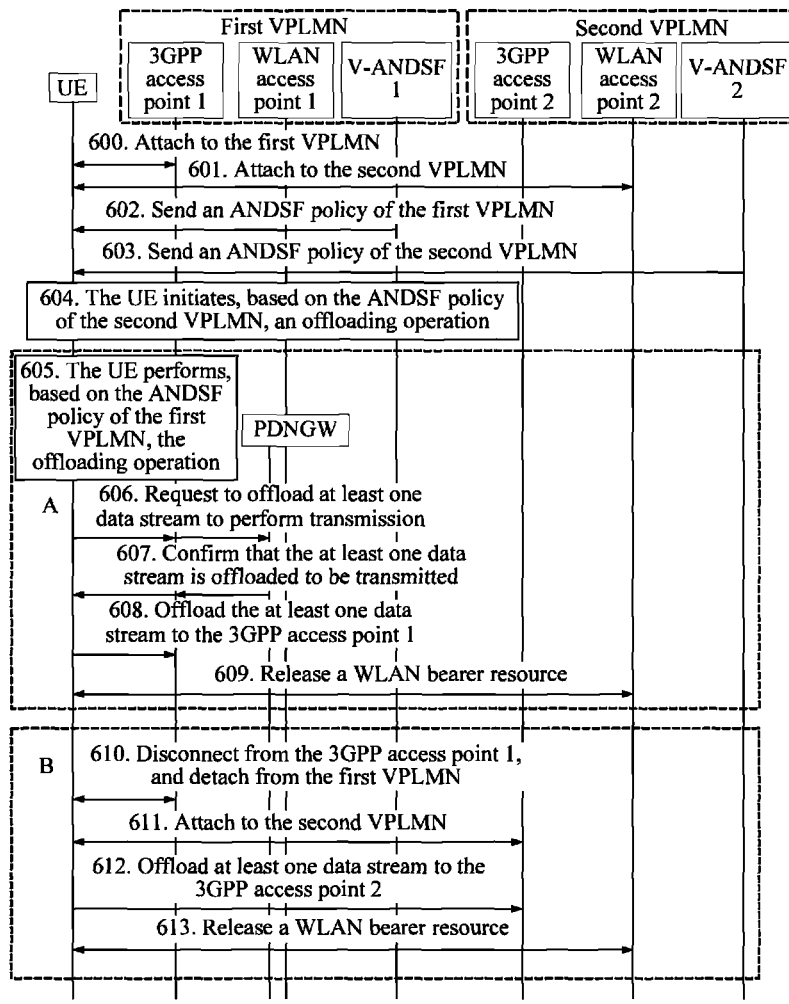
FIG. 6 is a signaling flowchart of a fifth network access processing method according to an embodiment of the present invention.

FIG. 6 is a signaling flowchart of a fifth network access processing method according to an embodiment of the present invention. Referring to FIG. 6, the following describes a scenario in which a data stream is offloaded from a WLAN access network to a 3GPP access network. Steps are as follows.

Step 600: UE attaches to a first VPLMN using a 3GPP access point 1.

Step 601: The UE attaches to a second VPLMN using a WLAN access point 2.

Step 602: V-ANDSF1 to which the first VPLMN belongs sends an ANDSF policy of the first VPLMN to the UE.

Step 603: V-ANDSF2 to which the second VPLMN belongs sends an ANDSF policy of the second VPLMN to the UE.

Step 604: The UE initiates, based on the ANDSF policy of the second VPLMN, an offloading operation.

If the UE determines to offload a data stream to the 3GPP access point 1 of the first VPLMN, steps 605-609 in block A are performed.

Step 605: The UE performs, based on the ANDSF policy of the first VPLMN, the offloading operation.

The UE determines, according to the ANDSF policy of the first VPLMN, whether the data stream can be transmitted using the 3GPP access point 1. For a data stream that cannot be transmitted using the 3GPP access point 1, according to a configuration of the UE, an operator policy, a network condition, and the like, the UE releases the data stream or reserves the data stream at the WLAN access point 2. For a data stream that can be transmitted using the 3GPP access point 1, the following steps 606-609 are performed.

Step 606: The UE requests, using the 3GPP access point 1, a PDN GW to offload at least one data stream to perform transmission.

Step 607: The PDN GW confirms, using the 3GPP access point 1, with the UE that the at least one data stream is offloaded to be transmitted.

Step 608: The UE offloads the at least one data stream to the 3GPP access point 1.

Step 609: The UE releases a WLAN bearer resource.

For the data stream offloaded to the 3GPP access point 1 to be transmitted, the UE or a network device, for example, a WLAN access gateway, may initiate release of a bearer resource that is at the WLAN access point 2 and corresponding to the data stream. For the data stream that cannot be offloaded to the 3GPP access point 1 to be transmitted, according to the configuration of the UE, the operator policy, the network condition, and the like, the UE releases the data stream or reserves the data stream at the WLAN access point 2.

Optionally, if the UE determines to offload a data stream to a 3GPP access point 2 of the second VPLMN, steps in block B are performed.

Step 610: The UE disconnects from the 3GPP access point 1, and detaches from the first VPLMN.

Step 611: The UE attaches to the second VPLMN using a 3GPP access point 2.

Step 612: The UE offloads at least one data stream to the 3GPP access point 2.

Step 613: The UE releases a WLAN bearer resource.

For the data stream offloaded to the 3GPP access point 2 to be transmitted, the UE or the network device, for example, the WLAN access gateway, may initiate release of the bearer resource that is at the WLAN access point 2 and corresponding to the data stream. For a data stream that cannot be offloaded to the 3GPP access point 2 to be transmitted, according to the configuration of the UE, the operator policy, the network condition, and the like, the UE releases the data stream or reserves the data stream at the WLAN access point 2.

Figure 7A:
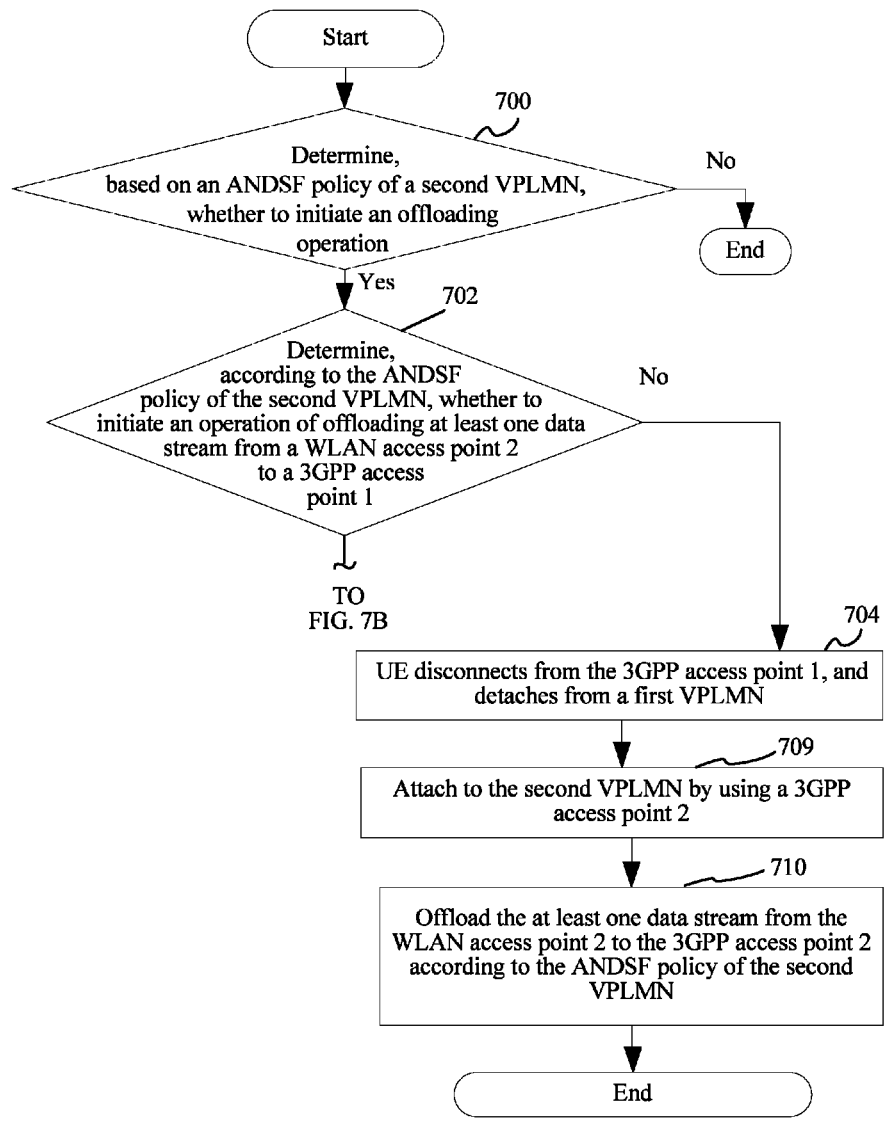
FIG. 7A and FIG. 7B are a decision flowchart of a fifth network access processing method according to an embodiment of the present invention.
Figure 7B:
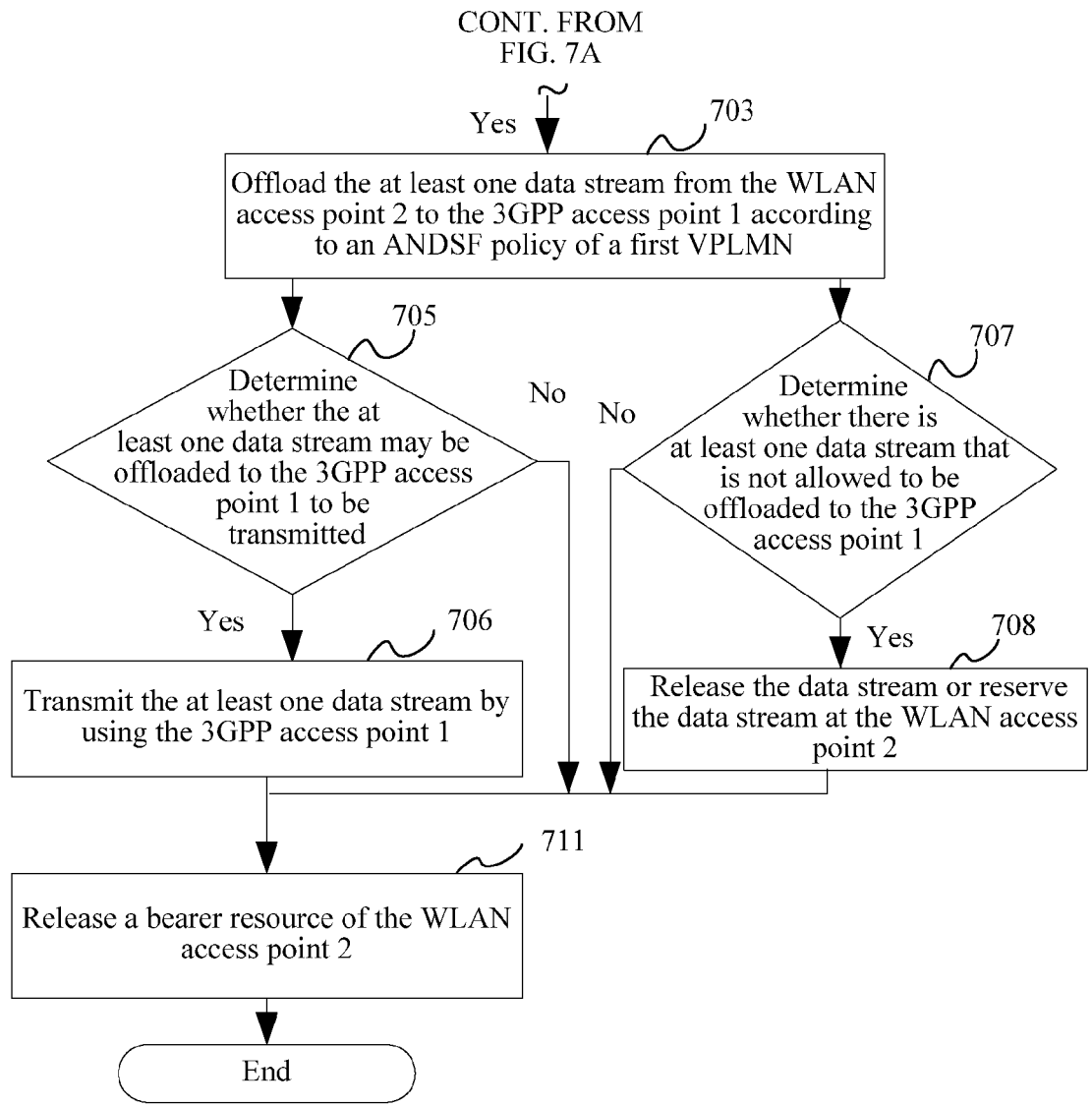

On the basis of FIG. 6, FIG. 7A and FIG. 7B are a decision flowchart of a fifth network access processing method according to an embodiment of the present invention, and steps are as follows.

Step 700: Determine, according to an ANDSF policy of a second VPLMN, whether to initiate an offloading operation.

Referring to step 604 in FIG. 6, UE determines, according to the ANDSF policy of the second VPLMN, whether to initiate the offloading operation. If the UE determines to initiate the offloading operation, step 702 is performed; if the UE does not determine to initiate the offloading operation, the process ends. Similar to step 500 in FIG. 5, optionally, the ANDSF policy of the second VPLMN may include a correspondence between at least one data stream and a 3GPP access point 1, or includes a correspondence between at least one data stream and the 3GPP access point 1 and a correspondence between at least one data stream and a 3GPP access point 2. That is, an offloading operation from a WLAN access network to a 3GPP access network is initiated and step 702 is performed, provided that the ANDSF policy of the second VPLMN includes a correspondence between at least one data stream and a 3GPP access point.

Step 702: Determine, according to the ANDSF policy of the second VPLMN, whether to initiate an operation of offloading at least one data stream from a WLAN access point 2 to a 3GPP access point 1.

The UE determines, according to the ANDSF policy of the second VPLMN, whether to initiate the operation of offloading the at least one data stream from the WLAN access point 2 to the 3GPP access point 1. If the UE determines to initiate the operation of offloading the at least one data stream from the WLAN access point 2to the 3GPP access point 1, step 703 is performed; if the UE determines, according to the ANDSF policy of the second VPLMN, that the operation of offloading the at least one data stream from the WLAN access point 2 to the 3GPP access point 1 cannot be initiated, step 704 is performed. Optionally, the UE performs 3GPP access network discovery and selection according to the ANDSF policy of the second VPLMN. If preferably selecting a new 3GPP access point 2 includes discovering the 3GPP access point 2, which has a higher priority, of the second VPLMN, step 704 is performed. It should be noted that, when a 3GPP access point that has a higher priority does not belong to the second VPLMN but belongs to another VPLMN, step 704 may also be performed so that the UE attaches to the foregoing another VPLMN using the new 3GPP access point that has a higher priority, so as to implement offloading of the at least one data stream from the WLAN access network to the 3GPP access network.

Step 703: Offload the at least one data stream from the WLAN access point 2 to the 3GPP access point 1 according to an ANDSF policy of a first VPLMN.

Referring to step 605 in FIG. 6, the offloading, by the UE, the at least one data stream from the WLAN access point 2 to the 3GPP access point 1 according to an ANDSF policy of a first VPLMN has two possible cases. Case 1: When the UE determines, according to the ANDSF policy of the first VPLMN, to offload the at least one data stream, step 705 is correspondingly performed. Case 2: When the UE determines, according to the ANDSF policy of the first VPLMN, that the at least one data stream is not allowed to be offloaded, step 707 is correspondingly performed.

Step 704: UE disconnects from the 3GPP access point 1, and detaches from the first VPLMN.

Referring to step 610 in FIG. 6, in step 702, when the UE determines, according to the ANDSF policy of the second VPLMN, that the operation of offloading the at least one data stream from the WLAN access point 2 to the 3GPP access point 1 cannot be initiated, the UE disconnects from the 3GPP access point 1, and detaches from the first VPLMN.

Step 705: Determine whether the at least one data stream may be offloaded to the 3GPP access point 1 to be transmitted.

In Case 1 of step 703, the UE determines, according to the ANDSF policy of the first VPLMN, to offload the at least one data stream. The UE determines, according to the ANDSF policy of the first VPLMN, whether the at least one data stream can be transmitted using the 3GPP access point 1. If the at least one data stream can be transmitted using the 3GPP access point 1, the UE performs step 706 and offloads the at least one data stream from the WLAN access point 2 to the 3GPP access point 1.

Step 706: Transmit the at least one data stream using the 3GPP access point 1.

Referring to step 608 in FIG. 6, the UE transmits the at least one data stream using the 3GPP access point 1.

Step 707: Determine whether there is at least one data stream that is not allowed to be offloaded to the 3GPP access point 1.

In Case 2 of step 703, the UE determines, according to the ANDSF policy of the first VPLMN, that the at least one data stream is not allowed to be offloaded, and the UE does not allow the at least one data stream to be offloaded.

Step 708: According to a configuration of the UE, an operator policy, a network condition, and the like, the UE releases the data stream or reserves the data stream at the WLAN access point 2 to perform transmission.

Step 709: Attach to the second VPLMN using a 3GPP access point 2.

For details, refer to step 611 in FIG. 6.

Step 710: Offload the at least one data stream from the WLAN access point 2 to the 3GPP access point 2 according to the ANDSF policy of the second VPLMN.

For details, refer to step 612 in FIG. 6.

Step 711: Release a bearer resource of the WLAN access point 2.

For details, refer to step 613 in FIG. 6.

Step 406 and step 407 in FIG. 4 may be implemented in two manners, and the following describes the two manners in detail by using two embodiments.

Figure 8:
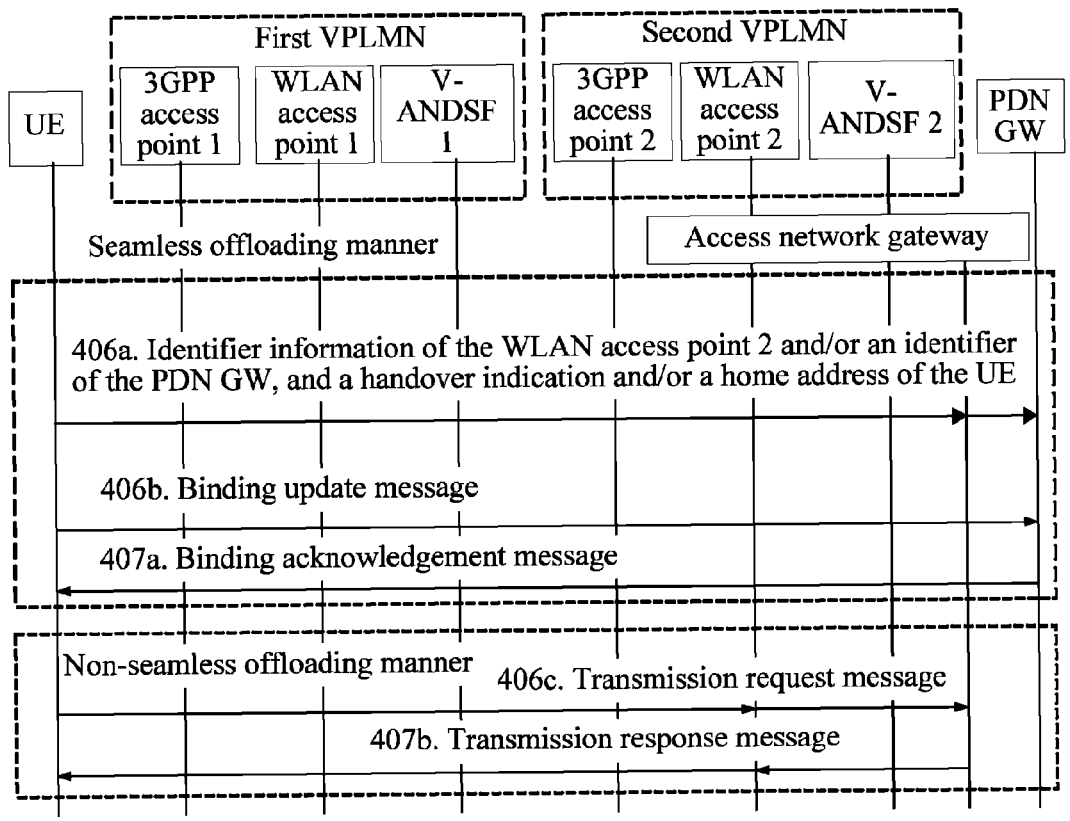
FIG. 8 is a signaling flowchart of a sixth network access processing method according to an embodiment of the present invention.

Manner 1 is implemented based on the Internet Protocol (IP). FIG. 8 is a signaling flowchart of a sixth network access processing method according to an embodiment of the present invention. In a scenario in which a data stream is offloaded from a WLAN access network to a 3GPP access network, the following steps in FIG. 8 may be used.

When a seamless offloading manner is used for performing an offloading operation, the following steps may be included.

Step 406*a*: UE sends, to an access network gateway, identifier information of a WLAN access point 2 and/or an identifier of a PDN GW, and a handover indication and/or a home address of the UE.

The access network gateway includes an enhanced packet data gateway (ePDG), a TWAG, and the like.

The UE executes, using the WLAN access point 2, a process of discovering a home network agent, that is, discovering a PDN GW. The access network gateway discovers a corresponding PDN GW according to the identifier information of the WLAN access point 2 and/or the identifier of the PDN GW. The access network gateway sends the foregoing handover indication and/or the home address of the UE to the PDN GW so that after a data stream is offloaded to the WLAN access point 2, the PDN GW allocates, for the data stream, an IP address that is the same as an IP address that is previously allocated for the data stream to be transmitted using a 3GPP access point 1. If before offloading is performed, the data stream belongs to a same packet data network connection as a data stream that is currently transmitted using the WLAN access point 2, for the data stream to be offloaded, the UE may use a current PDN GW and a corresponding IP address of a second VPLMN, and does not need to perform step 406*a*.

Step 406*b*: The UE sends a binding update message to the PDN GW.

The binding update message carries information, such as the home address of the UE and a routing rule, and the routing rule follows an ISRP of the second VPLMN. The PDN GW binds the home address of the UE with a care of IP address (CoA) of the UE so that downlink data that exists after binding is performed is accurately sent to the UE, thereby preventing a packet loss.

Step 407a: The PDN GW sends a binding acknowledgement message to the UE.

The binding acknowledgement message includes information such as a routing rule accepted by the PDN GW.

When a non-seamless offloading manner is used for performing the offloading operation, the following steps may be included.

Step 406c: The UE sends a transmission request message to the access network gateway using the WLAN access point 2.

The access network gateway may be a WLAN gateway, and the WLAN gateway includes a TWAG, a non-trusted WLAN access gateway, or the like.

The transmission request message carries a non-seamless offloading indication and data stream description information, where the non-seamless offloading indication may be implemented by setting an indication bit in an information element of the transmission request message. For example, when the indication bit is set to 1, it indicates that seamless offloading is performed; when the indication bit is set to 0, it indicates that non-seamless offloading is performed. The data stream description information may be quintuple information (that is, a source IP address, a source port number, a destination IP address, a destination port number, and a protocol number), or other information that may uniquely identify a data stream.

Step 407b: The access network gateway sends a transmission response message to the UE using the WLAN access point 2.

The transmission response message includes description information of a data stream that is indicated and accepted by the access network gateway to be offloaded by means of non-seamless offloading.

Figure 9:
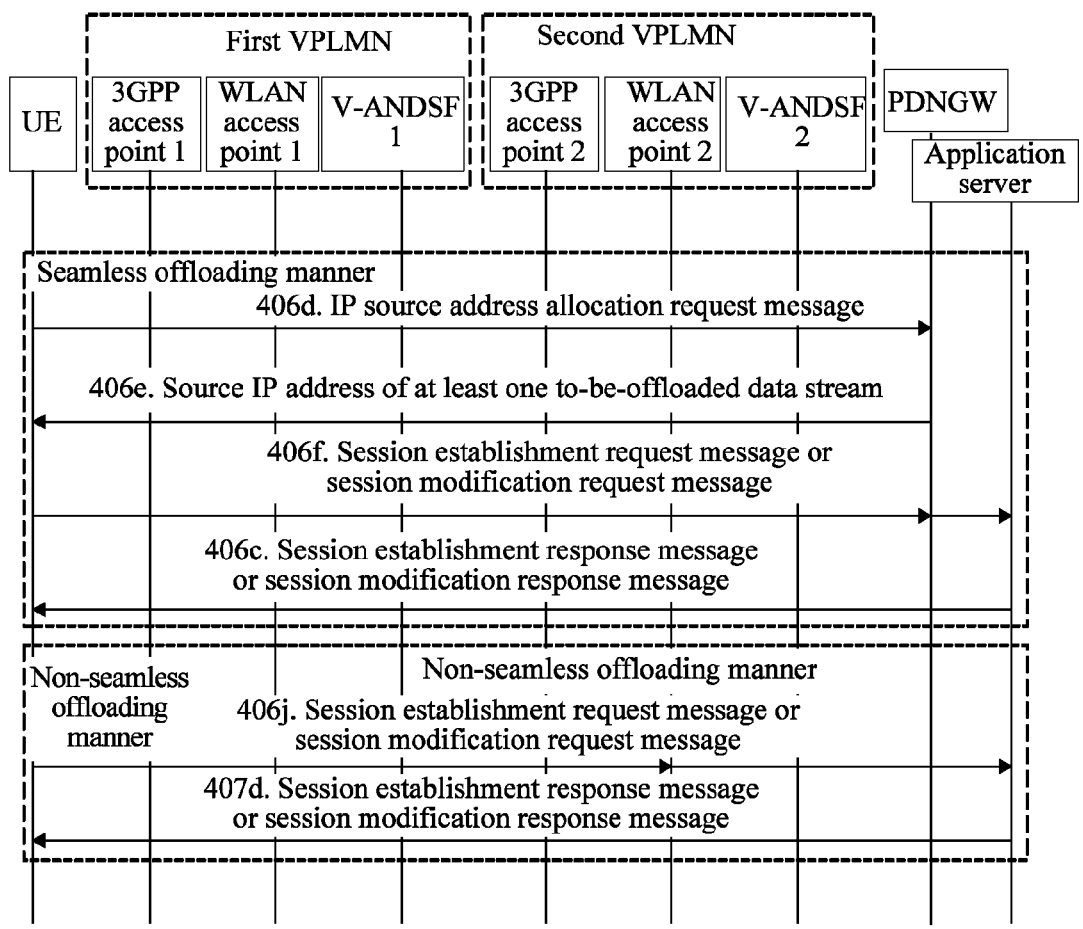
FIG. 9 is a signaling flowchart of a seventh network access processing method according to an embodiment of the present invention.

Manner 2 is implemented based on an application layer. FIG. 9 is a signaling flowchart of a seventh network access processing method according to an embodiment of the present invention. In a scenario in which a data stream is offloaded from a WLAN access network to a 3GPP access network, the following steps in FIG. 9 may be used.

When a seamless offloading manner is used for performing an offloading operation, the following steps may be included.

Step 406d: UE sends, to a PDN GW, an IP address allocation request message.

The UE sends, to the PDN GW using a WLAN access point 2, the IP address allocation request message. If a to-be-offloaded data stream and a data stream currently transmitted using the WLAN access point 2 belong to a same session, an IP address already allocated by the PDN GW is used.

Step 406e: The PDN GW sends the allocated IP address to the UE.

Step 406f: The UE sends a session establishment request message or a session modification request message to an application server using the PDN GW.

If the to-be-offloaded data stream and the data stream currently transmitted using the WLAN access point 2 belong to a same session, the UE sends the session modification request message to the application server. The session establishment request message or the session modification request message includes description information of the data stream, for example, an IP quintuple.

Step 406c: The application server sends a session establishment response message or a session modification response message to the UE.

The session establishment response message or the session modification response message includes description information of a data stream that is accepted by the application server and may be offloaded.

When a non-seamless offloading manner is used for performing the offloading operation, the following steps may be included.

Step 406j: The UE sends a session establishment request message or a session modification request message to the application server using a WLAN access point 2.

Similar to step 406f, if a to-be-offloaded data stream and a data stream currently transmitted using the WLAN access point 2 belong to a same session, the UE sends the session modification request message to the application server. The session establishment request message or the session modification request message includes the description information of the data stream, for example, a quintuple.

Step 407d: The application server sends a session establishment response message or a session modification response message to the UE.

Details are similar to step 407c.

When the data stream is offloaded from the WLAN access network to the 3GPP access network, step 606 and step 607 in FIG. 6 are also implemented in the foregoing two manners. However, it should be noted that, in the scenario in which offloading is performed from the WLAN access network to the 3GPP access network, the non-seamless offloading manner does not exist. Therefore, offloading in step 606 and step 607 in FIG. 6 can be implemented only in the seamless offloading manner in FIG. 8 and FIG. 9.

Figure 10:
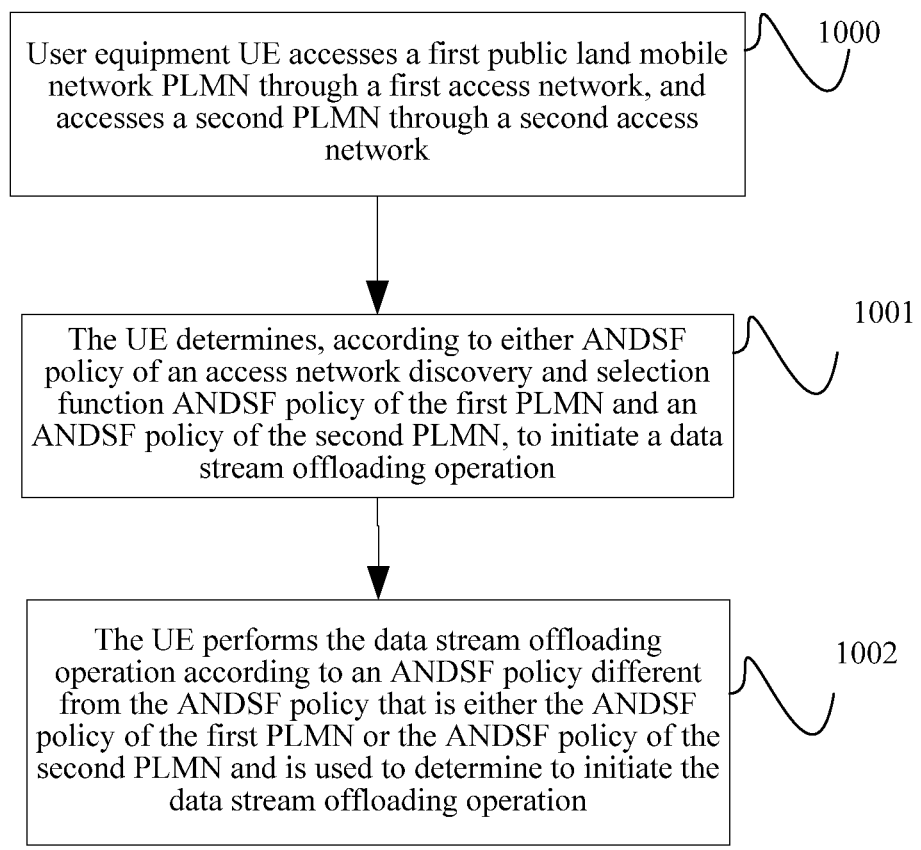
FIG. 10 is a signaling flowchart of an eighth network access processing method according to an embodiment of the present invention.

FIG. 10 is a flowchart of an eighth network access processing method according to an embodiment of the present invention. FIG. 10 includes the following steps.

Step 1000: UE accesses a first PLMN through a first access network, and accesses a second PLMN through a second access network.

Step 1001: The UE determines, according to either ANDSF policy of an ANDSF policy of the first PLMN and an ANDSF policy of the second PLMN, to initiate a data stream offloading operation.

In a roaming scenario, the UE may access the first PLMN through the first access network, and access the second PLMN through the second access network. In addition, ANDSF that belongs to the first PLMN sends the ANDSF policy of the first PLMN to the UE, and ANDSF that belongs to the second PLMN sends the ANDSF policy of the second PLMN to the UE. The foregoing ANDSF policies include information indicating which data stream may undergo an offloading operation between the first access network and the second access network, for example, which data stream that can be transmitted or is preferentially transmitted on the first access network, and which data stream that can be transmitted or is preferentially transmitted on the second access network. When the ANDSF policy of the first PLMN and the ANDSF policy of the second PLMN include information used for an offloading operation, which may be performed between the first access network and the second access network, on at least one data stream, the UE may initiate the offloading operation according to the ANDSF policy of the first PLMN or the ANDSF policy of the second PLMN.

In addition, it should be noted that, the UE may perform step 1001 after accessing the first PLMN through the first access network and accessing the second PLMN through the second access network in step 1000. Alternatively, in step 1000, the UE may access the first PLMN through the first access network, and in this case, the UE may directly determine, according to the ANDSF policy of the first PLMN, to initiate the data stream offloading operation. Then, the UE accesses the second PLMN through the second access network, receives the ANDSF policy of the second PLMN, and performs the data stream offloading operation. Similarly, the UE may also first access the second PLMN through the second access network, and then access the first PLMN through the first access network.

Step 1002: The UE performs the data stream offloading operation according to an ANDSF policy different from the ANDSF policy that is either the ANDSF policy of the first PLMN or the ANDSF policy of the second PLMN and is used to determine to initiate the data stream offloading operation.

If the UE initiates the offloading operation according to the ANDSF policy of the first PLMN, the UE performs the offloading operation according to the ANDSF policy of the second PLMN. If the UE initiates the offloading operation according to the ANDSF policy of the second PLMN, the UE performs the offloading operation according to the ANDSF policy of the first PLMN. Generally, the first PLMN and the second PLMN belong to different operators.

According to the network access processing method provided in this embodiment, the UE accesses a first PLMN through a first access network, and accesses a second PLMN through a second access network; the UE determines, according to either ANDSF policy of an ANDSF policy of the first PLMN and an ANDSF policy of the second PLMN, to initiate a data stream offloading operation; then the UE performs the data stream offloading operation according to an ANDSF policy different from the ANDSF policy that is either the ANDSF policy of the first PLMN or the ANDSF policy of the second PLMN and is used to determine to initiate the data stream offloading operation. Therefore, it is effectively ensured that, in a roaming scenario, after the UE receives ANDSF policies corresponding to different PLMNs, the UE cooperatively implements, according to different ANDSF policies, an operation of offloading a data stream between a 3GPP access network and a WLAN access network that are of different PLMNs, thereby improving utilization of a network resource, and reducing network congestion.

It should be noted that, a WLAN access network of a PLMN in this embodiment of the present invention refers to a WLAN access network indicated in an ANDSF policy of the PLMN, and may include a WLAN access network deployed by an operator of the PLMN, a WLAN access network deployed by an operator or an organization (such as an enterprise or a school) that has a roaming cooperation relationship with the operator of the PLMN, a WLAN access network that can interwork with the PLMN, and the like.

Figure 11:
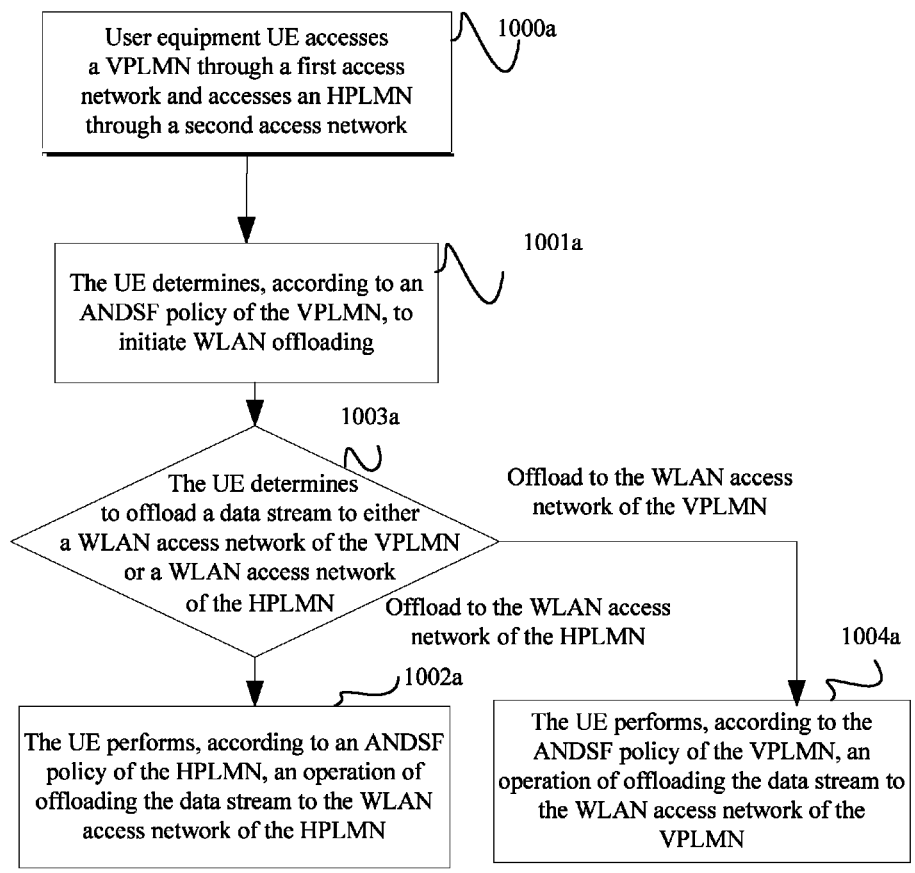
FIG. 11 is a decision flowchart of a ninth network access processing method according to an embodiment of the present invention.

On the basis of FIG. 10, further, FIG. 11 is a flowchart of a ninth network access processing method according to an embodiment of the present invention. Referring to FIG. 11, in a scenario in which the first access network is a 3GPP access network, the second access network is a WLAN access network, and the first PLMN is a VPLMN, the second PLMN is a HPLMN, and a data stream is offloaded from the 3GPP access network to the WLAN access network, in the foregoing step 1000 in FIG. 10, that the UE accesses a first PLMN through a first access network, and accesses a second PLMN through a second access network, referring to FIG. 11 includes the following steps.

Step 1000a: The UE accesses a VPLMN through the first access network and accesses an HPLMN through the second access network.

The foregoing step 1001 in FIG. 10, that is, the UE determines, according to either ANDSF policy of an ANDSF policy of the first PLMN and an ANDSF policy of the second PLMN, to initiate a data stream offloading operation includes the following step.

Step 1001a: The UE determines, according to an ANDSF policy of the VPLMN, to initiate WLAN offloading.

The WLAN offloading is that the data stream is offloaded (that is, transferred and switched) from the 3GPP access network to the WLAN access network.

Referring to FIG. 11, the foregoing step 1002 in FIG. 10, that is, the UE performs the data stream offloading operation according to an ANDSF policy different from the ANDSF policy that is either the ANDSF policy of the first PLMN or the ANDSF policy of the second PLMN and is used to determine to initiate the data stream offloading operation includes the following step.

Step 1002a: The UE performs, according to an ANDSF policy of the HPLMN, an operation of offloading a data stream to a WLAN access network of the HPLMN.

The WLAN access network of the HPLMN refers to a WLAN access network indicated in the ANDSF policy of the HPLMN, and may include a WLAN access network deployed by an operator of the HPLMN, a WLAN access network deployed by an operator or an organization (such as an enterprise or a school) that has a roaming cooperation relationship with the operator of the HPLMN, a WLAN access network that can interwork with the HPLMN, and the like. In this way, using step 1000a and step 1001a, in a roaming scenario, it may be effectively ensured that the UE cooperatively implements, according to the ANDSF policy of the VPLMN and the ANDSF policy of the HPLMN, an operation of offloading a data stream from a 3GPP access network to a WLAN access network, where the 3GPP access network and the WLAN access network are of different PLMNs, thereby improving utilization of a network resource, and reducing network congestion.

Further, referring to FIG. 11, in step 1001a, before the UE offloads the data stream to the WLAN access network of the HPLMN according to the ANDSF policy of the HPLMN, further includes the following steps.

Step 1003a: The UE determines to offload the data stream to either a WLAN access network of the VPLMN or the WLAN access network of the HPLMN.

If the UE determines to offload the data stream to the WLAN access network of the HPLMN, step 1002a is performed. If the UE determines to offload the data stream to the WLAN access network of the VPLMN, step 1004a is performed. Therefore, an offloading success rate may be improved so as to ensure that the data stream is offloaded to a WLAN access network whose network environment is relatively good and ensure transmission quality of the data stream.

Step 1004a: The UE performs, according to the ANDSF policy of the VPLMN, an operation of offloading the data stream to the WLAN access network of the VPLMN.

Step 1003a, that is, the UE determines to offload the data stream to either a WLAN access network of the VPLMN or the WLAN access network of the HPLMN, includes that the UE performs WLAN access network discovery and selection according to the ANDSF policy of the VPLMN or the ANDSF policy of the HPLMN, and determines to offload the data stream to either the WLAN access network of the VPLMN or the WLAN access network of the HPLMN.

Preferably, the UE performs WLAN access network discovery and selection according to the ANDSF policy of the VPLMN or the ANDSF policy of the HPLMN, and determines to offload the data stream to the WLAN access network of the HPLMN so that it is implemented that the data stream is offloaded to an accessed WLAN access network to be transmitted. Optionally, the UE performs WLAN access network discovery and selection according to the ANDSF policy of the VPLMN or the ANDSF policy of the HPLMN, and determines to offload the data stream to the WLAN access network of the VPLMN.

Further, in the foregoing network access processing method, step 1002a, that is, the UE performs, according to an ANDSF policy of the HPLMN, an operation of offloading a data stream to a WLAN access network of the HPLMN includes that the UE determines, according to the ANDSF policy of the HPLMN, an offloading manner in which the data stream is transmitted through the WLAN access network; and the UE offloads the data stream to the WLAN access network of the HPLMN according to the offloading manner.

When offloading is performed from the 3GPP access network to the WLAN access network, the offloading manner may include seamless offloading and/or non-seamless offloading. Non-seamless offloading is that the data stream directly accesses a service network through the WLAN access network, and seamless offloading is that the data stream accesses a 3GPP core network through the WLAN access network, and further accesses a service network using the 3GPP core network. The offloading, by the UE, the data stream to the WLAN access network of the HPLMN according to the offloading manner includes transmitting a part or all of the data stream through the WLAN access network of the HPLMN in a non-seamless WLAN offloading manner; or transmitting a part or all of the data stream through the WLAN access network of the HPLMN in a seamless WLAN offloading manner; or transmitting a part of the data stream through the WLAN access network of the HPLMN in a non-seamless WLAN offloading manner, and transmitting the other part of the data stream through the WLAN access network of the HPLMN in a seamless WLAN offloading manner.

Further, before the offloading, by the UE, the data stream to the WLAN access network of the HPLMN according to the offloading manner, further includes determining, by the UE according to the ANDSF policy of the HPLMN, whether the data stream can be transmitted through the WLAN access network, and if the data stream can be transmitted through the WLAN access network, performing the step of offloading, by the UE, the data stream to the WLAN access network of the HPLMN according to the offloading manner.

The UE determines, according to the ANDSF policy of the HPLMN, whether the data stream can be transmitted through the WLAN access network. For example, the UE determines, according to the ANDSF policy of the HPLMN, whether the data stream can be offloaded to the WLAN access network of the HPLMN in a non-seamless offloading and/or seamless offloading manner. If normal transmission of the data stream can be ensured after the offloading, the step of offloading, by the UE, the data stream to the WLAN access network of the HPLMN according to the offloading manner is performed.

Figure 12:
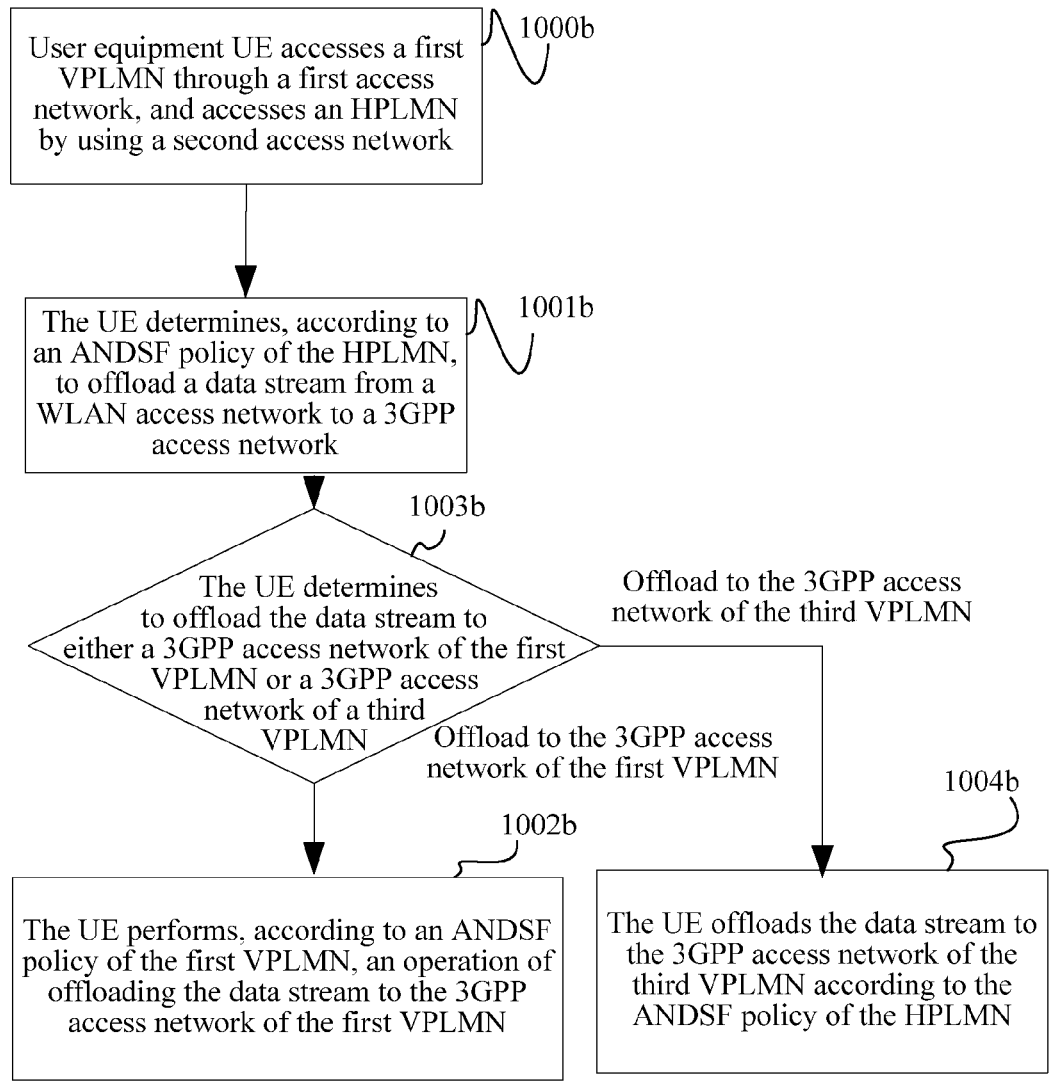
FIG. 12 is a signaling flowchart of a tenth network access processing method according to an embodiment of the present invention.

On the basis of FIG. 10, further, FIG. 12 is a flowchart of a tenth network access processing method according to an embodiment of the present invention. Referring to FIG. 12, in a scenario in which the first access network is a 3GPP access network, the second access network is a WLAN access network, and the first PLMN is a first VPLMN, the second PLMN is an HPLMN, and a data stream is offloaded from the WLAN access network to the 3GPP access network, the foregoing step 1000 in FIG. 10, that is, UE accesses a first PLMN through a first access network, and accesses a second PLMN through a second access network includes the following step.

Step 1000b: The UE accesses a first VPLMN through the first access network and accesses the HPLMN through the second access network.

Referring to FIG. 12, the foregoing step 1001 in FIG. 10, that is, the UE determines, according to either ANDSF policy of an ANDSF policy of the first PLMN and an ANDSF policy of the second PLMN, to initiate a data stream offloading operation includes the following step.

Step 1001b: The UE determines, according to the ANDSF policy of the HPLMN, to offload a data stream from a WLAN access network to a 3GPP access network.

Referring to FIG. 12, step 1002 in FIG. 10, that is, the UE performs the data stream offloading operation according to an ANDSF policy different from the ANDSF policy that is either the ANDSF policy of the first PLMN or the ANDSF policy of the second PLMN and is used to determine to initiate the data stream offloading operation includes the following step.

Step 1002b: The UE performs, according to an ANDSF policy of the first VPLMN, an operation of offloading the data stream to a 3GPP access network of the first VPLMN.

Further, referring to FIG. 12, before step 1002b, that is, the UE offloads the data stream to a 3GPP access network of the first VPLMN according to the ANDSF policy of the first VPLMN, further includes the following steps.

Step 1003b: The UE determines to offload the data stream to either the 3GPP access network of the first VPLMN or a 3GPP access network of a third VPLMN.

If the UE determines to offload the data stream to the 3GPP access network of the first VPLMN, step 1002b is performed. If the UE determines to offload the data stream to the 3GPP access network of the third VPLMN, step 1004b is performed. In this way, using step 1001b and step 1002b, in a roaming scenario, it may be effectively ensured that the UE cooperatively implements, according to the ANDSF policy of the first VPLMN and the ANDSF policy of the HPLMN, an operation of offloading a data stream from a WLAN access network to a 3GPP access network, where the WLAN access network and the 3GPP access network are of different PLMNs, thereby improving utilization of a network resource, and reducing network congestion.

Step 1004b: The UE offloads the data stream to the 3GPP access network of the third VPLMN according to the ANDSF policy of the HPLMN.

Step 1003b, that is, the UE determines to offload the data stream to either the 3GPP access network of the first VPLMN or a 3GPP access network of a third VPLMN, includes that the UE performs 3GPP access network discovery and selection according to the ANDSF policy of the HPLMN, and determines to offload the data stream to either the 3GPP access network of the first VPLMN or the 3GPP access network of the third VPLMN.

Preferably, the UE performs 3GPP access network discovery and selection according to the ANDSF policy of the HPLMN, and determines to offload the data stream to the 3GPP access network of the first VPLMN so that it is implemented that the data stream is offloaded to an accessed 3GPP access network to be transmitted. Optionally, the UE performs 3GPP access network discovery and selection according to the ANDSF policy of the HPLMN, and determines to offload the data stream to the 3GPP access network of the third VPLMN.

Further, in the foregoing network access processing method, step 1002b, that is, the UE performs, according to the ANDSF policy of the first VPLMN, an operation of offloading the data stream to a 3GPP access network of the first VPLMN includes that the UE determines, according to the ANDSF policy of the first VPLMN, whether the data stream can be transmitted through the 3GPP access network, and if the data stream can be transmitted through the 3GPP access network, offloads, by the UE, the data stream to the 3GPP access network of the first VPLMN.

Further, in the foregoing network access processing method, whether offloading is performed from the 3GPP access network to the WLAN access network or from the WLAN access network to the 3GPP access network, step 1001 in FIG. 10, that is, the UE determines, according to either ANDSF policy of an ANDSF policy of the first VPLMN and an ANDSF policy of the HPLMN, to initiate a data stream offloading, operation includes that the UE determines, according to an ISRP in the ANDSF policy, to initiate the data stream offloading operation.

Step 1002 in FIG. 10, that is, the UE performs the data stream offloading operation according to an ANDSF policy different from the ANDSF policy that is either the ANDSF policy of the first VPLMN or the ANDSF policy of the HPLMN and is used to determine to initiate the data stream offloading operation, includes that the UE performs the data stream offloading operation according to an ISRP in the ANDSF policy different from the ANDSF policy that is used to determine to initiate the data stream offloading operation.

Figure 13:
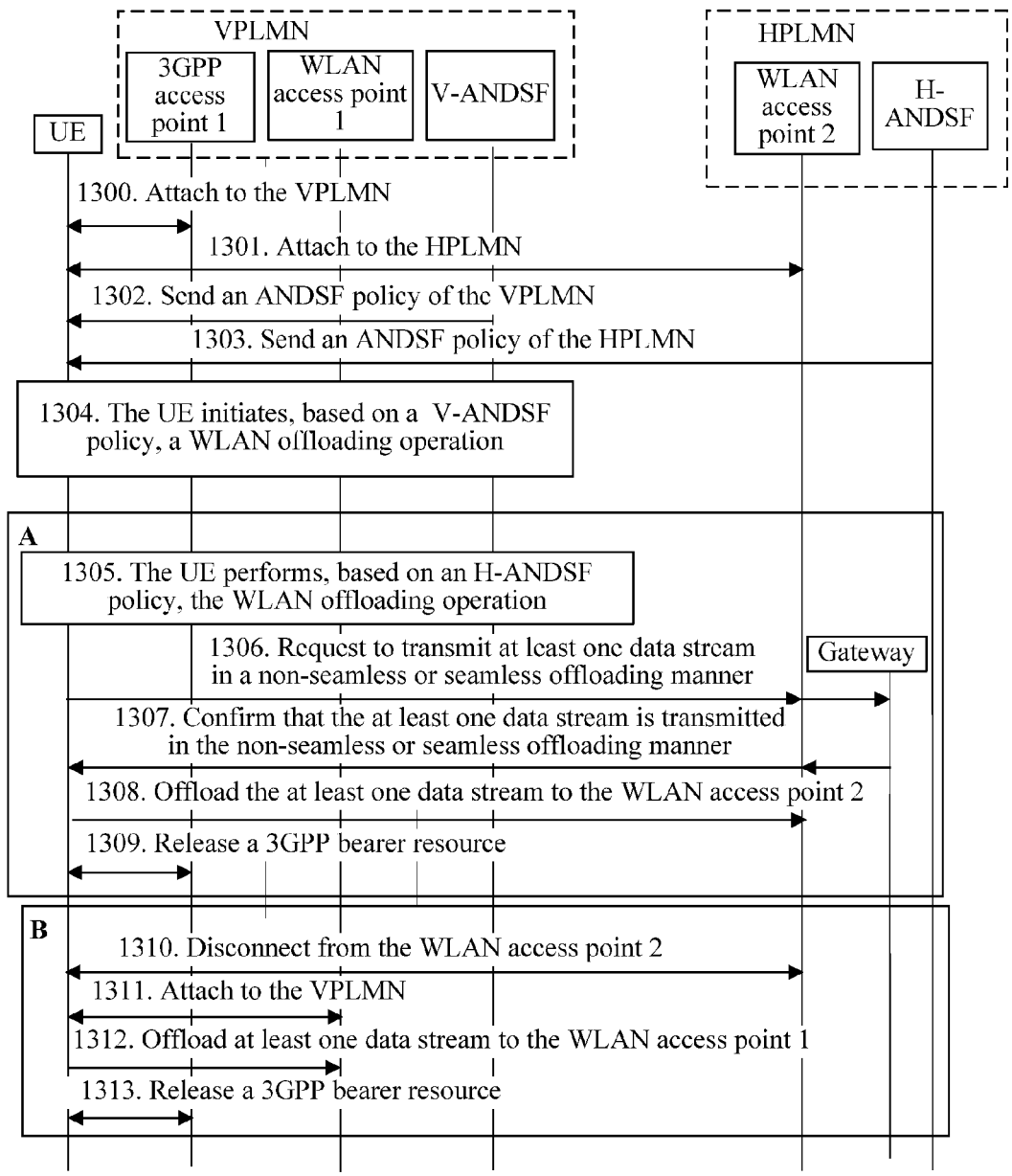
FIG. 13 is a decision flowchart of an eleventh network access processing method according to an embodiment of the present invention.

FIG. 13 is a signaling flowchart of an eleventh network access processing method according to an embodiment of the present invention. Referring to FIG. 13, the following describes a scenario in which a data stream is offloaded from a 3GPP access network of a VPLMN to a WLAN access network of an HPLMN. Steps are as follows.

Step 1300: UE attaches to a VPLMN using a 3GPP access point 1.

The 3GPP access point 1 may be a cell of the 3GPP access network, and the cell may be identified by a cell ID in an ANDSF policy.

Step 1301: The UE attaches to an HPLMN using a WLAN access point 2.

The WLAN access point 2 may be an access point or a hotspot of the WLAN access network, and is identified by an SSID, a BSSID, and/or an HESSID, and/or the like in an ANDSF policy.

Step 1302: V-ANDSF to which the VPLMN belongs sends an ANDSF policy of the VPLMN to the UE.

Step 1303: H-ANDSF to which the HPLMN belongs sends an ANDSF policy of the HPLMN to the UE.

Step 1304: The UE initiates, based on the ANDSF policy of the VPLMN, a WLAN offloading operation.

The UE determines, based on an ISRP in the ANDSF policy of the VPLMN, to initiate an offloading operation. If the ISRP includes a correspondence between one or more data streams and the WLAN access network, it indicates that the one or more data streams may be offloaded to the WLAN access network.

Step 1305: The UE performs, based on the ANDSF policy of the HPLMN, the WLAN offloading operation.

If the UE determines to offload a data stream to the WLAN access point of the HPLMN, steps 1305-1309 in block A are performed. The UE determines, based on an ISRP in the ANDSF policy of the HPLMN, which data stream can be offloaded to the WLAN access point 2 to be transmitted, which data stream is transmitted using the WLAN access point 2 in a non-seamless offloading manner and which data stream is transmitted using the WLAN access point 2 in a seamless offloading manner; and which data stream is not allowed to be transmitted using the WLAN access point 2. For the data stream that cannot be offloaded to the WLAN access point 2 to be transmitted, according to a configuration of the UE, an operator policy, a network condition, and the like, the UE releases the data stream or continues to transmit the data stream using the 3GPP access point 1.

Step 1306: The UE requests, using the WLAN access point 2, a gateway to transmit at least one data stream in a non-seamless offloading or seamless offloading manner.

The gateway may be a WLAN gateway or a PDN GW, where the WLAN gateway includes a TWAG, a non-trusted WLAN access gateway, or the like.

Step 1307: The gateway confirms, using the WLAN access point 2, with the UE that the at least one data stream is transmitted in the non-seamless offloading or seamless offloading manner.

The WLAN gateway or the PDN GW accepts the request of the UE, and allows the data stream in the request to be offloaded in a corresponding offloading manner to be transmitted. It should be noted that, the PDN GW may further allow, according to a current network condition such as network load or a congestion condition, that the offloading operation is performed on only a part of the data stream in the request and even refuse to perform the offloading operation on the data stream in the request.

Step 1308: The UE offloads the at least one data stream to the WLAN access point 2.

The UE offloads, to the WLAN access point 2, the data stream that the PDN GW allows to be offloaded.

Step 1309: The UE releases a 3GPP bearer resource.

For the data stream offloaded to the WLAN access point 2 to be transmitted, the UE or a network device, for example, the PDN GW, may initiate release of a bearer resource that is at the 3GPP access point 1 and corresponding to the data stream. For the data stream that cannot be offloaded to the WLAN access point 2 to be transmitted, according to the configuration of the UE, the operator policy, the network condition, and the like, the UE releases the data stream or reserves the data stream at the 3GPP access point 1.

Optionally, if the UE determines to offload a data stream to a WLAN access network of the VPLMN, steps 1310-1313 in block B are performed.

Step 1310: The UE disconnects from the WLAN access point 2.

Step 1311: The UE attaches to the VPLMN using a WLAN access point 1.

Step 1312: The UE offloads at least one data stream to the WLAN access point 1.

The UE determines, according to the ISRP in the ANDSF policy of the VPLMN, whether a to-be-offloaded data stream is transmitted using the WLAN access point 1 in a seamless offloading or non-seamless offloading manner, and after determining an offloading manner, offloads the to-be-offloaded data stream to the WLAN access point 1.

Step 1313: The UE releases a 3GPP bearer resource.

For the data stream offloaded to the WLAN access point 1 to be transmitted, the UE or the network device, for example, the PDN GW, may initiate release of the bearer resource at the 3GPP access point 1.

Figure 14A:
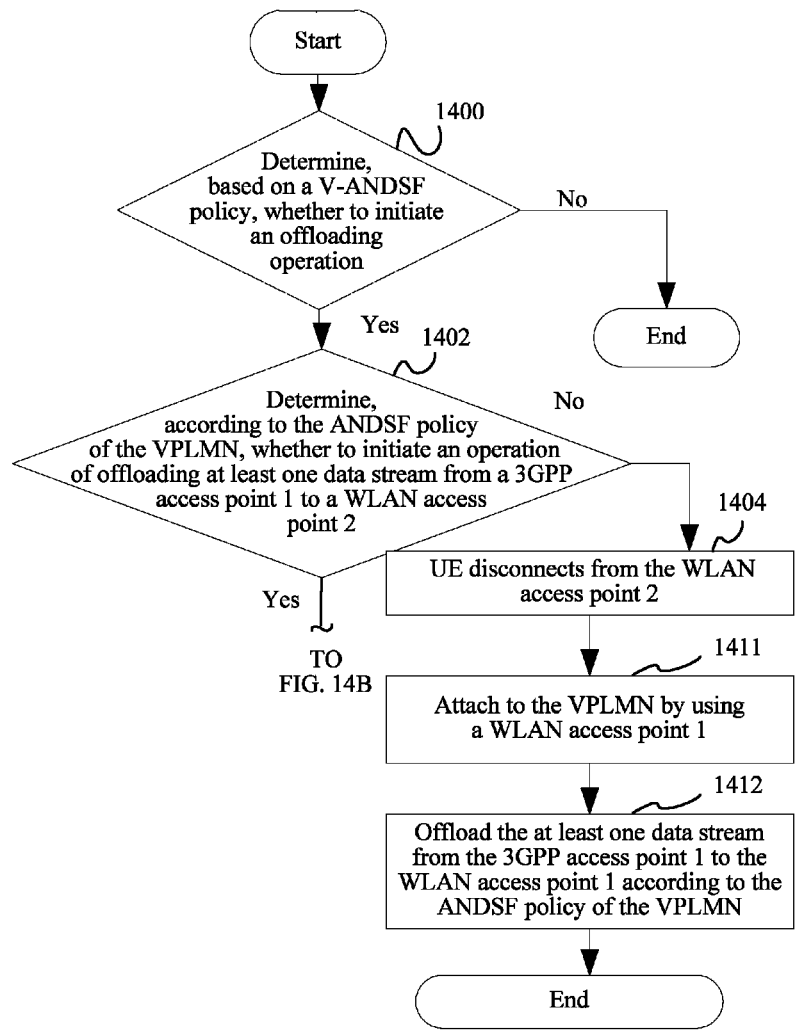
FIG. 14A and FIG. 14B are a signaling flowchart of an eleventh network access processing method according to an embodiment of the present invention.
Figure 14B:
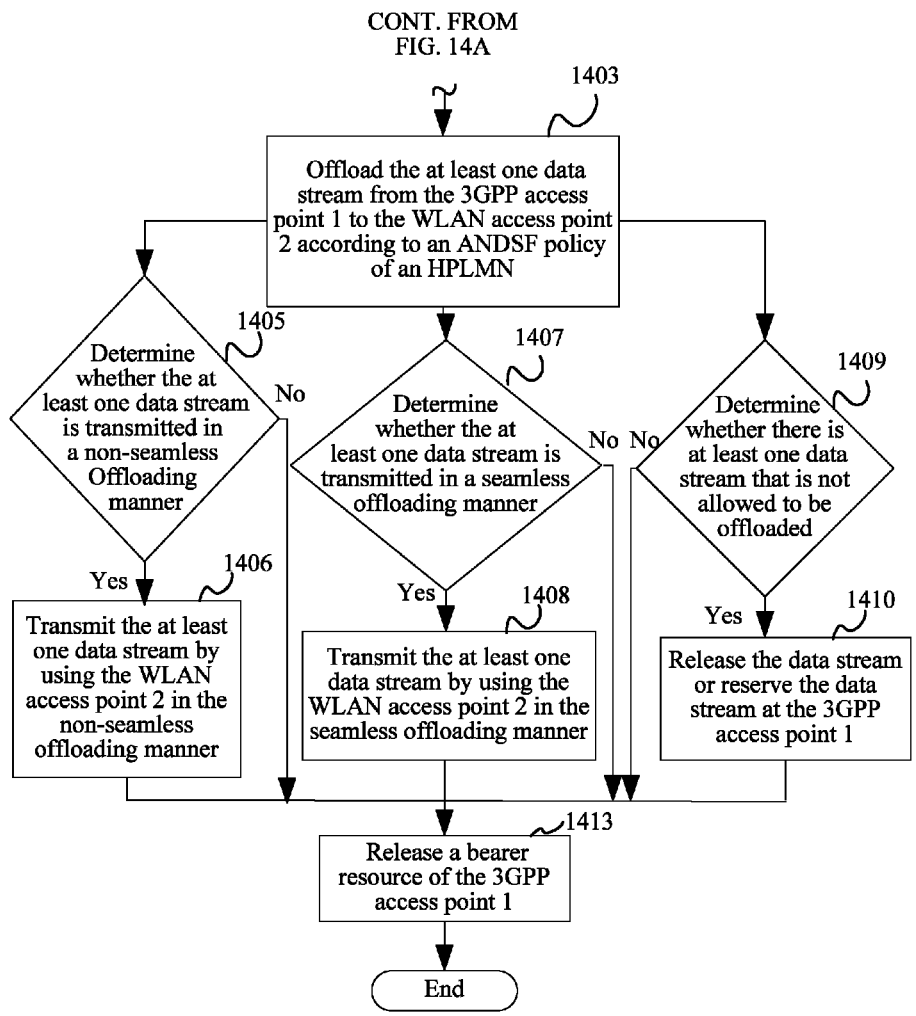

On the basis of FIG. 13, FIG. 14A and FIG. 14B are a decision flowchart of an eleventh network access processing method according to an embodiment of the present invention, and steps are as follows.

Step 1400: Determine, according to an ANDSF policy of a VPLMN, whether to initiate an offloading operation.

Referring to step 1304 in FIG. 13, in step 1400, UE determines, according to the ANDSF policy of the VPLMN, whether to initiate the offloading operation. If the UE determines to initiate the offloading operation, step 1402 is performed; if the UE does not determine to initiate the offloading operation, the process ends. Optionally, an effective ISRP rule in the ANDSF policy of the VPLMN may include a correspondence between at least one data stream and a WLAN, a WLAN offloading operation is initiated, and step 1402 is performed.

Step 1402: Determine, according to the ANDSF policy of the VPLMN, whether to initiate an operation of offloading at least one data stream from a 3GPP access point 1 to a WLAN access point 2.

The UE determines, according to the ANDSF policy of the VPLMN, whether to initiate the operation of offloading the at least one data stream from the 3GPP access point 1 to the WLAN access point 2. If the UE determines to initiate the operation of offloading the at least one data stream from the 3GPP access point 1 to the WLAN access point 2, step 1403 is performed. In step 1402, if the UE determines, according to the ANDSF policy of the VPLMN, that the operation of offloading the at least one data stream from the 3GPP access point 1 to the WLAN access point 2 cannot be initiated, optionally, the UE performs WLAN discovery and selection according to the ANDSF policy of the VPLMN or an ANDSF policy of an HPLMN. If preferably selecting a new WLAN access point 1 includes discovering the WLAN access point 1, which has a higher priority, of the VPLMN, step 1404 is performed. It should be noted that, when a WLAN access point that has a higher priority does not belong to the VPLMN but belongs to another VPLMN, step 1404 may also be performed so that the UE attaches to the foregoing another VPLMN using the new WLAN access point that has a higher priority, so as to implement WLAN offloading.

Step 1403: Offload the at least one data stream from the 3GPP access point 1 to the WLAN access point 2 according to an ANDSF policy of an HPLMN.

Referring to step 1305 in FIG. 13, the offloading, by the UE, the at least one data stream from the 3GPP access point 1 to the WLAN access point 2 according to an ANDSF policy of an HPLMN has three possible cases. Case 1: When the UE determines, according to the ANDSF policy of the HPLMN, that the at least one data stream is offloaded in a non-seamless offloading manner, step 1405 is correspondingly performed. Case 2: When the UE determines, according to the ANDSF policy of a second HPLMN, that the at least one data stream is offloaded in a seamless offloading manner, step 1407 is correspondingly performed. Case 3: When the UE determines, according to the ANDSF policy of the HPLMN, that the at least one data stream is not allowed to be offloaded, step 1409 is correspondingly performed.

Step 1404: UE disconnects from the WLAN access point 2.

Step 1405: Determine whether the at least one data stream is transmitted in a non-seamless offloading manner.

In Case 1 of step 1403, the UE determines, according to the ANDSF policy of the HPLMN, that the at least one data stream is offloaded in the non-seamless offloading manner, and the UE transmits the at least one data stream in the non-seamless offloading manner.

Step 1406: Transmit the at least one data stream using the WLAN access point 2 in the non-seamless offloading manner.

Step 1407: Determine whether the at least one data stream is transmitted in a seamless offloading manner.

The UE determines, according to the ANDSF policy of the HPLMN, that the at least one data stream is transmitted in the seamless offloading manner, and the UE transmits the at least one data stream in the seamless offloading manner.

Step 1408: Transmit the at least one data stream using the WLAN access point 2 in the seamless offloading manner.

Step 1409: Determine whether there is at least one data stream that is not allowed to be offloaded.

In Case 3 of step 1403, the UE determines, according to the ANDSF policy of the HPLMN, that the at least one data stream is not allowed to be offloaded, and the UE does not allow the at least one data stream to be offloaded.

Step 1410: Release the data stream or reserve the data stream at the 3GPP access point 1.

For the data stream that cannot be offloaded to the WLAN access point 2 to be transmitted, according to a configuration of the UE, an operator policy, a network condition, and the like, the UE releases the data stream or reserves the data stream at the 3GPP access point 1.

Step 1411: Attach to the VPLMN using a WLAN access point 1.

Referring to step 1311 in FIG. 13, after step 1404 is performed, the UE attaches to the VPLMN using the WLAN access point 1.

Step 1412: Offload the at least one data stream from the 3GPP access point 1 to the WLAN access point 1 according to the ANDSF policy of the VPLMN.

Referring to step 1312 in FIG. 13, the UE offloads the at least one data stream from the 3GPP access point 1 to the WLAN access point 1 according to the ANDSF policy of the VPLMN.

Step 1413: Release a bearer resource of the 3GPP access point 1.

Referring to step 1309 and step 1313 in FIG. 13, the UE releases the bearer resource of the 3GPP access point 1.

Figure 15:
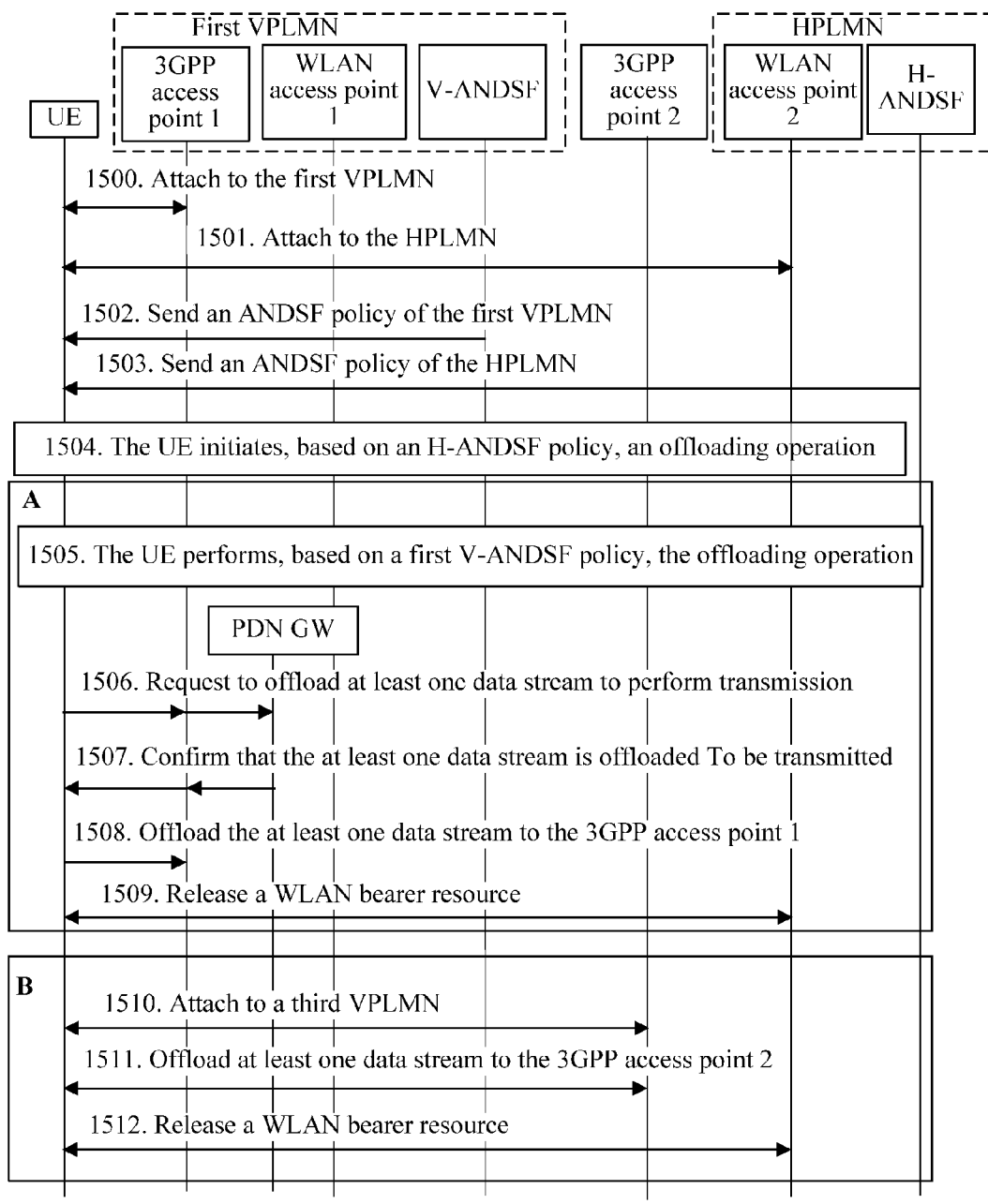
FIG. 15 is a decision flowchart of a twelfth network access processing method according to an embodiment of the present invention.

FIG. 15 is a signaling flowchart of a twelfth network access processing method according to an embodiment of the present invention. Referring to FIG. 15, the following describes a scenario in which a data stream is offloaded from a WLAN access network of an HPLMN to a 3GPP access network of a VPLMN. Steps are as follows.

Step 1500: UE attaches to a first VPLMN using a 3GPP access point 1.

Step 1501: The UE attaches to an HPLMN using a WLAN access point 2.

Step 1502: V-ANDSF to which the first VPLMN belongs sends an ANDSF policy of the first VPLMN to the UE.

Step 1503: H-ANDSF to which the HPLMN belongs sends an ANDSF policy of the HPLMN to the UE.

Step 1504: The UE initiates, based on the ANDSF policy of the HPLMN, an offloading operation.

The UE determines, according to the ANDSF policy of the HPLMN, whether to initiate an operation of offloading at least one data stream from the WLAN access point 2 to the 3GPP access point 1. If the UE determines to initiate the operation of offloading the at least one data stream from the WLAN access point 2 to the 3GPP access point 1, steps 1505-1509 in block A are performed. If the UE determines, according to the ANDSF policy of the HPLMN, that the operation of offloading the at least one data stream from the WLAN access point 2 to the 3GPP access point 1 cannot be initiated, optionally, the UE performs 3GPP access network discovery and selection according to the ANDSF policy of the HPLMN. If preferably selecting a new 3GPP access point 2 includes discovering the 3GPP access point 2, which has a higher priority, of a third VPLMN, steps 1510-1512 in block B are performed so as to implement offloading of the at least one data stream from the WLAN access network to the 3GPP access network.

Step 1505: The UE performs, based on the ANDSF policy of the first VPLMN, the offloading operation.

The UE determines, according to the ANDSF policy of the first VPLMN, whether the data stream can be transmitted using the 3GPP access point 1. For a data stream that cannot be transmitted using the 3GPP access point 1, according to a configuration of the UE, an operator policy, a network condition, and the like, the UE releases the data stream or reserves the data stream at the WLAN access point 2. For a data stream that can be transmitted using the 3GPP access point 1, the following steps 1506-1509 are performed.

Step 1506: The UE requests, using the 3GPP access point 1, a PDN GW to offload at least one data stream to perform transmission.

Step 1507: The PDN GW confirms, using the 3GPP access point 1, with the UE that the at least one data stream is offloaded to be transmitted.

Step 1508: The UE offloads the at least one data stream to the 3GPP access point 1.

Step 1509: The UE releases a WLAN bearer resource.

For the data stream offloaded to the 3GPP access point 1 to be transmitted, the UE or a network device, for example, a WLAN access gateway, may initiate release of a bearer resource that is at the WLAN access point 2 and corresponding to the data stream. For the data stream that cannot be offloaded to the 3GPP access point 1 to be transmitted, according to the configuration of the UE, the operator policy, the network condition, and the like, the UE releases the data stream or reserves the data stream at the WLAN access point 2.

Optionally, if the UE determines to offload a data stream to the 3GPP access point 2 of the third VPLMN, steps 1510-1512 in block B are performed.

Step 1510: The UE attaches to a third VPLMN using a 3GPP access point 2.

Step 1511: The UE offloads at least one data stream to the 3GPP access point 2.

Step 1512: The UE releases a WLAN bearer resource.

For the data stream offloaded to the 3GPP access point 2 to be transmitted, the UE or the network device, for example, the WLAN access gateway, may initiate release of the bearer resource that is at the WLAN access point 2 and corresponding to the data stream. For a data stream that cannot be offloaded to the 3GPP access point 2 to be transmitted, according to the configuration of the UE, the operator policy, the network condition, and the like, the UE releases the data stream or reserves the data stream at the WLAN access point 2.

Figure 16A:
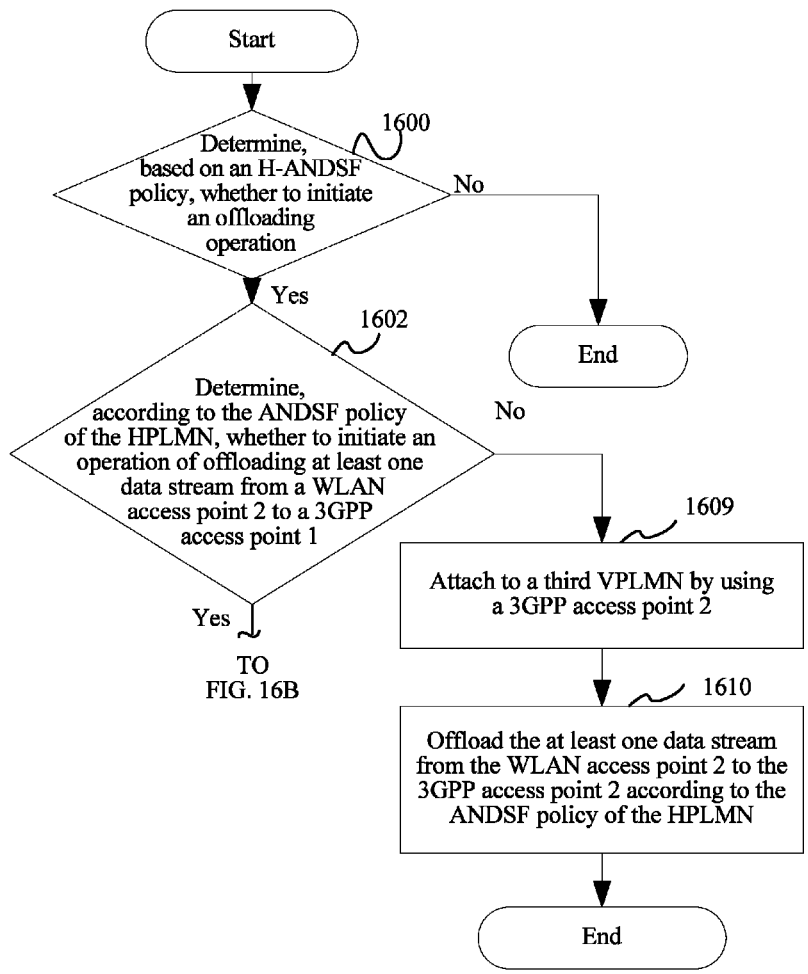
FIG. 16A and FIG. 16B are a signaling flowchart of a twelfth network access processing method according to an embodiment of the present invention.
Figure 16B:
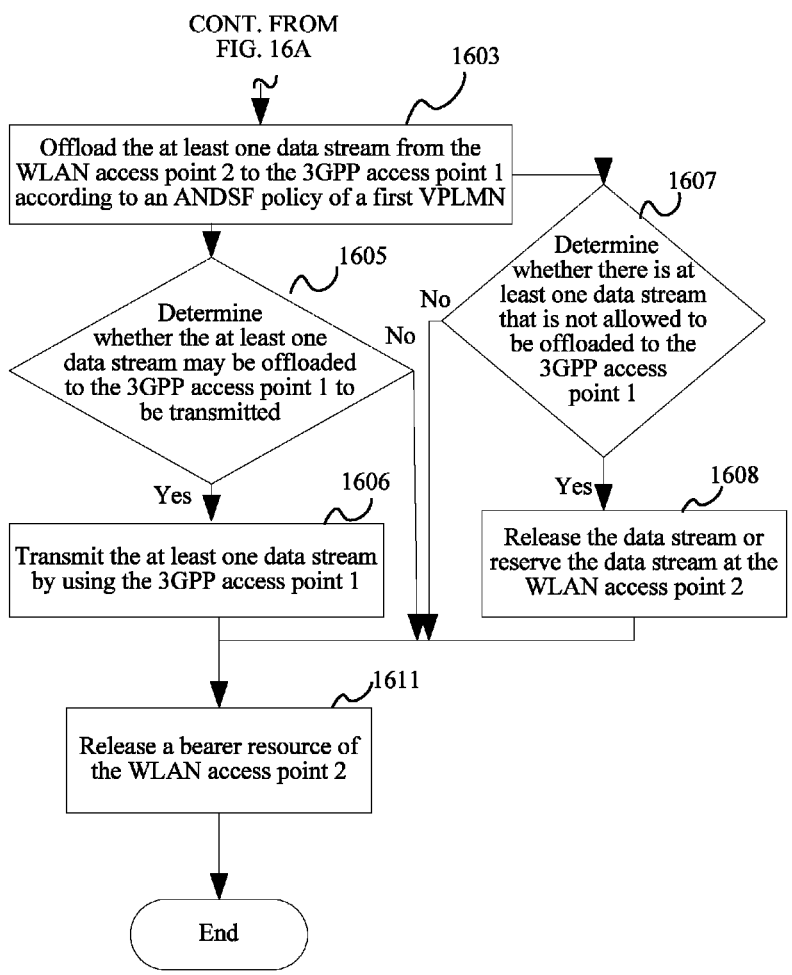

On the basis of FIG. 15, FIG. 16A and FIG. 16B are a decision flowchart of a twelfth network access processing method according to an embodiment of the present invention, and steps are as follows.

Step 1600: Determine, according to an ANDSF policy of an HPLMN, whether to initiate an offloading operation.

Referring to step 1504 in FIG. 15, UE determines, according to the ANDSF policy of the HPLMN, whether to initiate the offloading operation. If the UE determines to initiate the offloading operation, step 1602 is performed; if the UE does not determine to initiate the offloading operation, the process ends. Similar to step 500 in FIG. 5, optionally, an effective ISRP rule in the ANDSF policy of the HPLMN may include a correspondence between at least one data stream and a 3GPP access network, the offloading operation from a WLAN access network to a 3GPP access network is initiated, and step 1602 is performed.

Step 1602: Determine, according to the ANDSF policy of the HPLMN, whether to initiate an operation of offloading at least one data stream from a WLAN access point 2 to a 3GPP access point 1.

The UE determines, according to the ANDSF policy of the HPLMN, whether to initiate the operation of offloading the at least one data stream from the WLAN access point 2 to the 3GPP access point 1. If the UE determines to initiate the operation of offloading the at least one data stream from the WLAN access point 2 to the 3GPP access point 1, step 1603 is performed. If the UE determines, according to the ANDSF policy of the HPLMN, that the operation of offloading the at least one data stream from the WLAN access point 2 to the 3GPP access point 1 cannot be initiated, optionally, the UE performs 3GPP access network discovery and selection according to the ANDSF policy of the HPLMN. If preferably selecting a new 3GPP access point 2 includes discovering the 3GPP access point 2 of a third VPLMN that has a higher priority, steps 1609-1611 are performed so as to implement offloading of the at least one data stream from a WLAN access network to a 3GPP access network.

Step 1603: Offload the at least one data stream from the WLAN access point 2 to the 3GPP access point 1 according to an ANDSF policy of a first VPLMN.

Referring to step 1505 in FIG. 15, the offloading, by the UE, the at least one data stream from the WLAN access point 2 to the 3GPP access point 1 according to an ANDSF policy of a first VPLMN has two possible cases. Case 1: When the UE determines, according to the ANDSF policy of the first VPLMN, to offload the at least one data stream, step 1605 is correspondingly performed. Case 2: When the UE determines, according to the ANDSF policy of the first VPLMN, that the at least one data stream is not allowed to be offloaded, step 1607 is correspondingly performed.

Step 1605: Determine whether the at least one data stream may be offloaded to the 3GPP access point 1 to be transmitted.

In Case 1 of step 1603, the UE determines, according to the ANDSF policy of the first VPLMN, to offload the at least one data stream. The UE determines, according to the ANDSF policy of the first VPLMN, whether the at least one data stream can be transmitted using the 3GPP access point 1. If the at least one data stream can be transmitted using the 3GPP access point 1, the UE performs step 1606 and offloads the at least one data stream from the WLAN access point 2 to the 3GPP access point 1.

Step 1606: Transmit the at least one data stream using the 3GPP access point 1.

Referring to step 1508 in FIG. 15, the UE transmits the at least one data stream using the 3GPP access point 1.

Step 1607: Determine whether there is at least one data stream that is not allowed to be offloaded to the 3GPP access point 1.

In Case 2 of step 1603, the UE determines, according to the ANDSF policy of the first VPLMN, that the at least one data stream is not allowed to be offloaded, and the UE does not allow the at least one data stream to be offloaded.

Step 1608: According to a configuration of the UE, an operator policy, a network condition, and the like, UE releases the data stream or reserves the data stream at the WLAN access point 2 to perform transmission.

Optionally, if the UE determines to offload the data stream to the 3GPP access point 2 of the third VPLMN, steps 1609-1611 are performed.

Step 1609: Attach to a third VPLMN using a 3GPP access point 2.

For details, refer to step 1510 in FIG. 15.

Step 1610: Offload the at least one data stream from the WLAN access point 2 to the 3GPP access point 2 according to the ANDSF policy of the HPLMN.

For details, refer to step 1511 in FIG. 15.

Step 1611: Release a bearer resource of the WLAN access point 2.

For details, refer to step 1512 in FIG. 15.

Step 1306 and step 1307 in FIG. 13 may also be implemented in two manners in FIG. 8 and FIG. 9. Step 1506 and step 1507 in FIG. 15 may also be implemented in two manners in FIG. 8 and FIG. 9. However, it should be noted that, in the scenario in which offloading is performed from the WLAN access network to the 3GPP access network, the non-seamless offloading manner does not exist. Therefore, offloading in step 1506 and step 1507 in FIG. 15 can be implemented only by using the seamless offloading manner in FIG. 8 and FIG. 9. For specific steps, refer to FIG. 8 and FIG. 9, and details are not described herein again.

Figure 17:
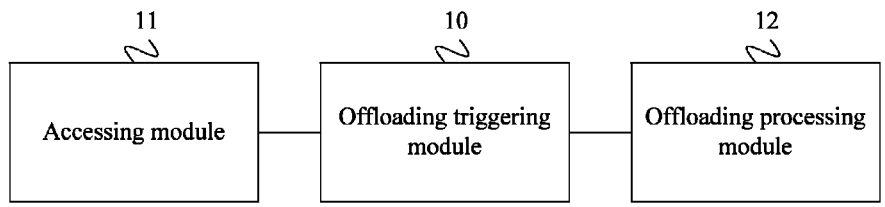
FIG. 17 is a schematic structural diagram of a UE according to an embodiment of the present invention.

FIG. 17 is a schematic structural diagram of UE according to an embodiment of the present invention. Referring to FIG. 17, the UE includes an offloading triggering module 10, an accessing module 11, and an offloading processing module 12.

The accessing module 11 is configured to access a first VPLMN through a first access network, and access a second VPLMN through a second access network, or configured to access a first VPLMN through a first access network and access an HPLMN through a second access network.

The offloading triggering module 10 is configured to determine, according to either ANDSF policy of an ANDSF policy of the first VPLMN and an ANDSF policy of the second VPLMN, to initiate a data stream offloading operation; or configured to determine, according to either ANDSF policy of an ANDSF policy of the first VPLMN and an ANDSF policy of the HPLMN, to initiate a data stream offloading operation.

The offloading processing module 12 is configured to perform the data stream offloading operation according to an ANDSF policy different from the ANDSF policy that is either the ANDSF policy of the first VPLMN or the ANDSF policy of the second VPLMN and is used to determine to initiate the data stream offloading operation, or configured to perform the data stream offloading operation according to an ANDSF policy different from the ANDSF policy that is either the ANDSF policy of the first VPLMN or the ANDSF policy of the HPLMN and is used to determine to initiate the data stream offloading operation.

According to the UE provided in this embodiment of the present invention, an accessing module accesses a first VPLMN through a first access network, and accesses a second VPLMN or an HPLMN through a second access network; after the first VPLMN is accessed through the first access network, and the second VPLMN or the HPLMN is accessed through the second access network, an offloading triggering module determines, according to either ANDSF policy of an ANDSF policy of the first VPLMN and an ANDSF policy of the second VPLMN or the HPLMN, to initiate a data stream offloading operation; and then an offloading processing module performs the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation. It is effectively ensured that, in a roaming scenario, after the UE receives ANDSF policies corresponding to different VPLMNs, the offloading triggering module and the offloading processing module of the UE cooperatively implement, according to different ANDSF policies, an operation of offloading a data stream between a 3GPP access network and a WLAN access network that are of different VPLMNs, thereby improving utilization of a network resource, and reducing network congestion.

Figure 18:
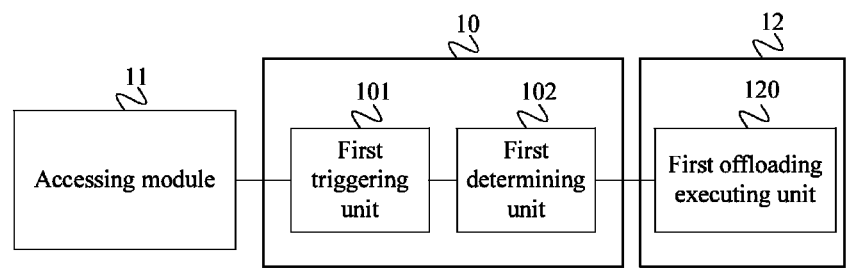
FIG. 18 is a schematic structural diagram of a second UE according to an embodiment of the present invention.

Further, on the basis of FIG. 17, FIG. 18 is a schematic structural diagram of second UE according to an embodiment of the present invention. Referring to FIG. 18, in a scenario in which the first access network is a 3GPP access network, the second access network is a WLAN access network, and a data stream is offloaded from the 3GPP access network to the WLAN access network, the offloading triggering module 10 includes a first triggering unit 101.

The first triggering unit 101 is configured to determine, according to the ANDSF policy of the first VPLMN, to initiate WLAN offloading.

The offloading processing module 12 includes a first offloading executing unit 120.

The first offloading executing unit 120 is configured to offload a data stream to a WLAN access network of the second VPLMN according to the ANDSF policy of the second VPLMN; or configured to offload a data stream to a WLAN access network of the HPLMN according to the ANDSF policy of the HPLMN.

Further, referring to FIG. 18, the offloading triggering module 10 further includes a first determining unit 102.

The first determining unit 102 is configured to determine to offload the data stream to either a WLAN access network of the first VPLMN or the WLAN access network of the second VPLMN; or configured to determine to offload the data stream to either a WLAN access network of the first VPLMN or the WLAN access network of the HPLMN.

If the first determining unit 102 performs WLAN access network discovery and selection according to the ANDSF policy of the first VPLMN, and determines to offload the data stream to the WLAN access network of the second VPLMN or the HPLMN, the first offloading executing unit 120 offloads the data stream to the WLAN access network of the second VPLMN or the HPLMN according to the ANDSF policy of the second VPLMN or the HPLMN. If the first determining unit 102 performs WLAN access network discovery and selection according to the ANDSF policy of the first VPLMN, and determines to offload the data stream to the WLAN access network of the first VPLMN, the first offloading executing unit 120 offloads the data stream to the WLAN access network of the first VPLMN according to the ANDSF policy of the first VPLMN. In this way, in a roaming scenario, it may be effectively ensured that the UE cooperatively implements, according to the ANDSF policy of the first VPLMN and the ANDSF policy of the second VPLMN, an operation of offloading a data stream from a 3GPP access network to a WLAN access network, where the 3GPP access network and the WLAN access network are of different VPLMNs, thereby improving utilization of a network resource, and reducing network congestion.

Further, the foregoing first determining unit 102 is configured to perform WLAN access network discovery and selection according to the ANDSF policy of the first VPLMN, and determine to offload the data stream to either the WLAN access network of the first VPLMN or the WLAN access network of the second VPLMN; or configured to perform WLAN access network discovery and selection according to the ANDSF policy of the first VPLMN, and determine to offload the data stream to either the WLAN access network of the first VPLMN or the WLAN access network of the HPLMN.

Further, the foregoing first offloading executing unit 120 is configured to determine, according to the ANDSF policy of the second VPLMN, an offloading manner in which the data stream is transmitted through the WLAN access network; or configured to determine, according to the ANDSF policy of the HPLMN, an offloading manner in which the data stream is transmitted through the WLAN access network.

The first offloading executing unit 120 is further configured to offload the data stream to the WLAN access network of the second VPLMN according to the offloading manner, or further configured to offload the data stream to the WLAN access network of the HPLMN according to the offloading manner.

In addition, the first determining unit 102 is further configured to determine, according to the ANDSF policy of the second VPLMN, whether the data stream can be transmitted through the WLAN access network. If the data stream can be transmitted through the WLAN access network, the first offloading executing unit 120 offloads the data stream to the WLAN access network of the second VPLMN according to the offloading manner. Alternatively, the first determining unit 102 is further configured to determine, according to the ANDSF policy of the HPLMN, whether the data stream can be transmitted through the WLAN access network. If the data stream can be transmitted through the WLAN access network, the first offloading executing unit 120 offloads the data stream to the WLAN access network of the HPLMN according to the offloading manner.

It should be noted that, the offloading manner includes transmitting a part or all of the data stream through the WLAN access network of the second VPLMN or the WLAN access network of the HPLMN in a non-seamless WLAN offloading manner; or transmitting a part or all of the data stream through the WLAN access network of the second VPLMN or the WLAN access network of the HPLMN in a seamless WLAN offloading manner; or transmitting a part of the data stream through the WLAN access network of the second VPLMN or the WLAN access network of the HPLMN in a non-seamless WLAN offloading manner, and transmitting the other part of the data stream through the WLAN access network of the second VPLMN or the WLAN access network of the HPLMN in a seamless WLAN offloading manner.

Figure 19:
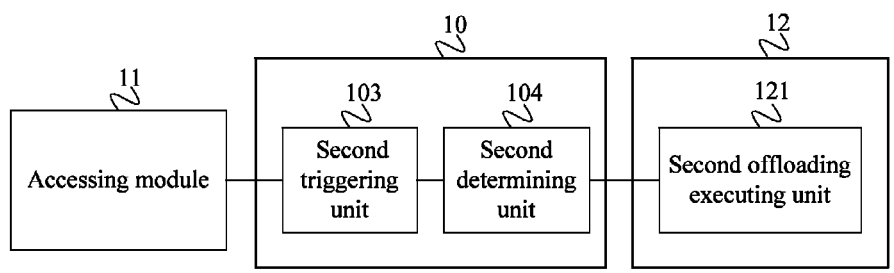
FIG. 19 is a schematic structural diagram of a third UE according to an embodiment of the present invention.

Further, on the basis of FIG. 17, FIG. 19 is a schematic structural diagram of third UE according to an embodiment of the present invention. Referring to FIG. 19, in a scenario in which the first access network is a 3GPP access network, the second access network is a WLAN access network, and a data stream is offloaded from the WLAN access network to the 3GPP access network, the offloading triggering module 10 includes a second triggering unit 103.

The second triggering unit 103 is configured to determine, according to the ANDSF policy of the second VPLMN, to offload a data stream from a WLAN access network to a 3GPP access network; or configured to determine, according to the ANDSF policy of the HPLMN, to offload a data stream from a WLAN access network to a 3GPP access network.

The offloading processing module 12 includes a second offloading executing unit 121.

The second offloading executing unit 121 is configured to offload the data stream to a 3GPP access network of the first VPLMN according to the ANDSF policy of the first VPLMN.

Further, referring to FIG. 19, the offloading triggering module 10 further includes a second determining unit 104.

The second determining unit 104 is configured to determine to offload the data stream to either the 3GPP access network of the first VPLMN or a 3GPP access network of the second VPLMN; or configured to determine to offload the data stream to either the 3GPP access network of the first VPLMN or a 3GPP access network of a third VPLMN.

If the second determining unit 104 performs 3GPP access network discovery and selection according to the ANDSF policy of the second VPLMN or the HPLMN, and determines to offload the data stream to the 3GPP access network of the first VPLMN, the second offloading executing unit 121 offloads the data stream to the 3GPP access network of the first VPLMN according to the ANDSF policy of the first VPLMN. If the second determining unit 104 performs 3GPP access network discovery and selection according to the ANDSF policy of the second VPLMN or the HPLMN, and determines to offload the data stream to the 3GPP access network of the second VPLMN or the 3GPP access network of the third VPLMN, the second offloading executing unit 121 offloads the data stream to the 3GPP access network of the second VPLMN or the 3GPP access network of the third VPLMN according to the ANDSF policy of the second VPLMN. In this way, in a roaming scenario, it may be effectively ensured that the UE cooperatively implements, according to the ANDSF policy of the first VPLMN and the ANDSF policy of the second VPLMN or the HPLMN, an operation of offloading a data stream from a WLAN access network to a 3GPP access network, where the WLAN access network and the 3GPP access network are of different VPLMNs, thereby improving utilization of a network resource, and reducing network congestion.

Further, the second determining unit 104 is configured to perform 3GPP access network discovery and selection according to the ANDSF policy of the second VPLMN, and determine to offload the data stream to either the 3GPP access network of the first VPLMN or the 3GPP access network of the second VPLMN; or configured to perform 3GPP access network discovery and selection according to the ANDSF policy of the HPLMN, and determine to offload the data stream to either the 3GPP access network of the first VPLMN or the 3GPP access network of the third VPLMN.

For the scenario in which the first access network is a 3GPP access network, the second access network is a WLAN access network, and the data stream is offloaded from the WLAN access network to the 3GPP access network, the second offloading executing unit 121 is configured to determine, according to the ANDSF policy of the first VPLMN, whether the data stream can be transmitted through the 3GPP access network; if the data stream can be transmitted through the 3GPP access network, the second offloading executing unit 121 offloads the data stream to the 3GPP access network of the first VPLMN.

Further, for the foregoing UE, whether offloading is performed from the 3GPP access network to the WLAN access network or from the WLAN access network to the 3GPP access network, the foregoing offloading triggering module 10 is configured to determine, according to an ISRP in the one ANDSF policy, to initiate the data stream offloading operation.

The offloading processing module 12 is configured to perform the data stream offloading operation according to an ISRP in the ANDSF policy different from the ANDSF policy that is used to determine to initiate the data stream offloading operation.

For example, when the offloading triggering module 10 determines, according to an ISRP in a first ANDSF policy, to initiate the data stream offloading operation, the offloading processing module 12 performs the data stream offloading operation according to an ISRP in a second ANDSF policy.

It should be noted that, the first triggering unit and the second triggering unit in the foregoing offloading triggering module 10 may be one triggering unit, the first determining unit and the second determining unit in the offloading triggering module 10 may be one determining unit, and the first offloading executing unit and the second offloading executing unit may be integrated into an offloading processing module. In two scenarios in which a data stream is offloaded from a WLAN access network to a 3GPP access network or a data stream is offloaded from a 3GPP access network to a WLAN access network, the triggering unit, the offloading executing unit, and the determining unit may implement a corresponding function of each of the foregoing units so as to ensure that the data stream can be offloaded.

Figure 20:
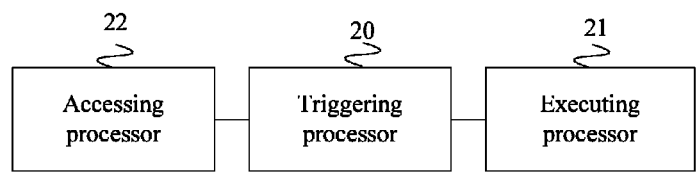
FIG. 20 is a schematic structural diagram of a fourth UE according to an embodiment of the present invention.

FIG. 20 is a schematic structural diagram of fourth UE according to an embodiment of the present invention. Referring to FIG. 20, the UE includes an accessing processor 22, a triggering processor 20, and an executing processor 21.

The accessing processor 22 is configured to access a first VPLMN through a first access network, and access a second VPLMN through a second access network, or configured to access a first VPLMN through a first access network, and access an HPLMN through a second access network.

The triggering processor 20 is configured to determine, according to either ANDSF policy of an ANDSF policy of the first VPLMN and an ANDSF policy of the second VPLMN, to initiate a data stream offloading operation; or configured to determine, according to either ANDSF policy of an ANDSF policy of the first VPLMN and an ANDSF policy of the HPLMN, to initiate a data stream offloading operation.

The executing processor 21 is configured to perform the data stream offloading operation according to an ANDSF policy different from the ANDSF policy that is either the ANDSF policy of the first VPLMN or the ANDSF policy of the second VPLMN and is used to determine to initiate the data stream offloading operation, or configured to perform the data stream offloading operation according to an ANDSF policy different from the ANDSF policy that is either the ANDSF policy of the first VPLMN or the ANDSF policy of the HPLMN and is used to determine to initiate the data stream offloading operation.

According to the UE provided in this embodiment of the present invention, after a first VPLMN is accessed through a first access network, and a second VPLMN or an HPLMN is accessed through a second access network, a triggering processor determines, according to either ANDSF policy of an ANDSF policy of the first VPLMN and an ANDSF policy of the second VPLMN or the HPLMN, to initiate a data stream offloading operation; then an executing processor performs the data stream offloading operation according to an ANDSF policy different from the ANDSF policy that is either the ANDSF policy of the first VPLMN or the ANDSF policy of the second VPLMN or the HPLMN and is used to determine to initiate the data stream offloading operation. It is effectively ensured that, in a roaming scenario, after the UE receives ANDSF policies corresponding to different PLMNs, processors of the UE cooperatively implement an operation of offloading a data stream between a 3GPP access network and a WLAN access network that are of different PLMNs, thereby improving utilization of a network resource, and reducing network congestion.

Further, in a scenario in which the first access network is a 3GPP access network, the second access network is a WLAN access network, and a data stream is offloaded from the 3GPP access network to the WLAN access network, the triggering processor 20 is configured to determine, according to the ANDSF policy of the first VPLMN, to initiate WLAN offloading; and the executing processor 21 is configured to offload a data stream to a WLAN access network of the second VPLMN according to the ANDSF policy of the second VPLMN; or configured to offload a data stream to a WLAN access network of the HPLMN according to the ANDSF policy of the HPLMN.

Further, the triggering processor 20 is further configured to determine to offload the data stream to either a WLAN access network of the first VPLMN or the WLAN access network of the second VPLMN; or further configured to determine to offload the data stream to either a WLAN access network of the first VPLMN or the WLAN access network of the HPLMN.

If the triggering processor 20 performs WLAN access network discovery and selection according to the ANDSF policy of the first VPLMN, and determines to offload the data stream to the WLAN access network of the second VPLMN or the HPLMN, the executing processor 21 offloads the data stream to the WLAN access network of the second VPLMN or the HPLMN according to the ANDSF policy of the second VPLMN or the HPLMN. If the triggering processor 20 performs WLAN access network discovery and selection according to the ANDSF policy of the first VPLMN, and determines to offload the data stream to the WLAN access network of the first VPLMN, the executing processor 21 offloads the data stream to the WLAN access network of the first VPLMN according to the ANDSF policy of the first VPLMN. In this way, in a roaming scenario, it may be effectively ensured that the triggering processor 20 and the executing processor 21 of the UE cooperatively implement, according to the ANDSF policy of the first VPLMN and the ANDSF policy of the second VPLMN or the HPLMN, an operation of offloading a data stream from a 3GPP access network to a WLAN access network, where the 3GPP access network and the WLAN access network are of different VPLMNs, thereby improving utilization of a network resource, and reducing network congestion.

Further, the foregoing triggering processor 20 is configured to perform WLAN access network discovery and selection according to the ANDSF policy of the first VPLMN, and determine to offload the data stream to either the WLAN access network of the first VPLMN or the WLAN access network of the second VPLMN; or configured to perform WLAN access network discovery and selection according to the ANDSF policy of the first VPLMN, and determine to offload the data stream to either the WLAN access network of the first VPLMN or the WLAN access network of the HPLMN.

Further, the foregoing triggering processor 20 is configured to determine, according to the ANDSF policy of the second VPLMN or the HPLMN, an offloading manner in which the data stream is transmitted through the WLAN access network.

The executing processor 21 is further configured to offload the data stream to the WLAN access network of the second VPLMN or the HPLMN according to the offloading manner.

In addition, the triggering processor 20 is further configured to determine, according to the ANDSF policy of the second VPLMN or the HPLMN, whether the data stream can be transmitted through the WLAN access network, and if the data stream can be transmitted through the WLAN access network, the executing processor 21 offloads the data stream to the WLAN access network of the second VPLMN or the HPLMN according to the offloading manner.

It should be noted that, the offloading manner includes transmitting a part or all of the data stream through the WLAN access network of the second VPLMN or the HPLMN in a non-seamless WLAN offloading manner; or transmitting a part or all of the data stream through the WLAN access network of the second VPLMN or the HPLMN in a seamless WLAN offloading manner; or transmitting a part of the data stream through the WLAN access network of the second VPLMN or the HPLMN in a non-seamless WLAN offloading manner, and transmitting the other part of the data stream through the WLAN access network of the second VPLMN or the HPLMN in a seamless WLAN offloading manner.

Further, in a scenario in which the first access network is a 3GPP access network, the second access network is a WLAN access network, and a data stream is offloaded from the WLAN access network to the 3GPP access network, the triggering processor 20 is configured to determine, according to the ANDSF policy of the second VPLMN, to offload a data stream from a WLAN access network to a 3GPP access network; or configured to determine, according to the ANDSF policy of the HPLMN, to offload a data stream from a WLAN access network to a 3GPP access network; and the executing processor 21 is further configured to offload the data stream to a 3GPP access network of the first VPLMN according to the ANDSF policy of the first VPLMN.

Further, the triggering processor 20 is further configured to determine to offload the data stream to either the 3GPP access network of the first VPLMN or a 3GPP access network of the second VPLMN; or further configured to determine to offload the data stream to either the 3GPP access network of the first VPLMN or a 3GPP access network of a third VPLMN.

If the triggering processor 20 performs 3GPP access network discovery and selection according to the ANDSF policy of the second VPLMN or the HPLMN, and determines to offload the data stream to the 3GPP access network of the first VPLMN, the executing processor 21 offloads the data stream to the 3GPP access network of the first VPLMN according to the ANDSF policy of the first VPLMN. If the triggering processor 20 performs 3GPP access network discovery and selection according to the ANDSF policy of the second VPLMN or the HPLMN, and determines to offload the data stream to the 3GPP access network of the second VPLMN or the 3GPP access network of the third VPLMN, the executing processor 21 offloads the data stream to the 3GPP access network of the second VPLMN or the 3GPP access network of the third VPLMN according to the ANDSF policy of the second VPLMN. In this way, in a roaming scenario, it may be effectively ensured that the triggering processor 20 and the executing processor 21 of the UE cooperatively implement, according to the ANDSF policy of the first VPLMN and the ANDSF policy of the second VPLMN or the HPLMN, an operation of offloading a data stream from a WLAN access network to a 3GPP access network, where the WLAN access network and the 3GPP access network are of different VPLMNs, thereby improving utilization of a network resource, and reducing network congestion.

Further, the triggering processor 20 is configured to perform 3GPP access network discovery and selection according to the ANDSF policy of the second VPLMN, and determine to offload the data stream to either the 3GPP access network of the first VPLMN or the 3GPP access network of the second VPLMN; or configured to perform 3GPP access network discovery and selection according to the ANDSF policy of the HPLMN, and determine to offload the data stream to either the 3GPP access network of the first VPLMN or the 3GPP access network of the third VPLMN.

For the scenario in which the first access network is a 3GPP access network, the second access network is a WLAN access network, and a data stream is offloaded from the WLAN access network to the 3GPP access network, the triggering processor 20 is configured to determine, according to the ANDSF policy of the first VPLMN, whether the data stream can be transmitted through the 3GPP access network; and if the data stream can be transmitted through the 3GPP access network, the executing processor 21 offloads the data stream to the 3GPP access network of the first VPLMN.

Further, for the triggering processor 20 and the executing processor 21 of the foregoing UE, whether offloading is performed from a 3GPP access network to a WLAN access network or from a WLAN access network to a 3GPP access network, the foregoing triggering processor 20 is configured to determine, according to an ISRP in the one ANDSF policy, to initiate the data stream offloading operation.

The executing processor 21 is further configured to perform the data stream offloading operation according to an ISRP in the ANDSF policy different from the ANDSF policy that is used to determine to initiate the data stream offloading operation.

For example, when the triggering processor 20 determines, according to an ISRP in a first ANDSF policy, to initiate the data stream offloading operation, the executing processor 21 performs the data stream offloading operation according to an ISRP in a second ANDSF policy.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network access processing method, comprising:
accessing, by user equipment (UE), a first visited public land mobile network (VPLMN) through a first access network of a first network type, wherein the first network type of the first access network is a 3rd Generation Partnership Project (3GPP) access network;
accessing a second VPLMN through a second access network of a second network type, wherein the second network type of the second access network is a wireless local area network (WLAN) access network;

determining, by the UE according to an access network discovery and selection function (ANDSF) policy of the first VPLMN, to initiate a data stream offloading operation on the second network type, wherein determining to initiate the data stream offloading operation comprises determining, by the UE according to the ANDSF policy of the first VPLMN, to initiate WLAN offloading; and performing, by the UE, the data stream offloading operation on the second network type of the second VPLMN according to an ANDSF policy of the second VPLMN, wherein performing the data stream offloading operation according to the ANDSF policy of the ANDSF policy of the second VPLMN comprises performing, by the UE according to the ANDSF policy of the second VPLMN, an operation of offloading a data stream to the WLAN access network of the second VPLMN.

2. The method according to claim 1, wherein performing the operation of offloading the data stream to the WLAN access network of the second VPLMN comprises:

determining, by the UE according to the ANDSF policy of the second VPLMN, an offloading manner in which the data stream is transmitted through the WLAN access network; and offloading, by the UE, the data stream to the WLAN access network of the second VPLMN according to the offloading manner.

3. The method according to claim 2, wherein the offloading manner comprises at least one of:

transmitting a part or all of the data stream through the WLAN access network of the second VPLMN in a non-seamless WLAN offloading manner;

transmitting a part or all of the data stream through the WLAN access network of the second VPLMN in a seamless WLAN offloading manner; or transmitting a part of the data stream through the WLAN access network of the second VPLMN in a non-seamless WLAN offloading manner, and transmitting the other part of the data stream through the WLAN access network of the second VPLMN in a seamless WLAN offloading manner.

4. A user equipment (UE), comprising:
a memory storing executable instructions; and
a processor coupled to the memory and configured to:
access a first visited public land mobile network (VPLMN) through a first access network, and configured to access one of a second VPLMN or a home public land mobile network (HPLMN) through a second access network;

determine, according to an access network discovery and selection function (ANDSF) policy of the first VPLMN, to initiate wireless local area network (WLAN) offloading; and perform the data stream offloading operation according to an ANDSF policy of one of the second VPLMN and the HPLMN by performing an operation of offloading a data stream to a WLAN access network of the second VPLMN according to the ANDSF policy of the second VPLMN, or offloading a data stream to a WLAN access network of the HPLMN according to the ANDSF policy of the HPLMN.

5. The UE according to claim 4, wherein the processor is further configured to:

determine, according to the ANDSF policy of one of the second VPLMN and the HPLMN, an offloading manner in which the data stream is transmitted through the WLAN access network; and offload the data stream to the WLAN access network of one of the second VPLMN and the HPLMN according to the offloading manner.

6. The UE according to claim 5, wherein the offloading manner comprises at least one of:

transmitting a part or all of the data stream through the WLAN access network of the second VPLMN or the HPLMN in a non-seamless WLAN offloading manner;

transmitting a part or all of the data stream through the WLAN access network of the second VPLMN or the HPLMN in a seamless WLAN offloading manner; or transmitting a part of the data stream through the WLAN access network of the second VPLMN or the HPLMN in a non-seamless WLAN offloading manner, and transmitting the other part of the data stream through the WLAN access network of the second VPLMN or the HPLMN in a seamless WLAN offloading manner.

7. A network access processing method, comprising:
accessing, by user equipment (UE), a first public land mobile network (PLMN) through a first access network of a first network type, and accessing a second PLMN through a second access network of a second network type, wherein the first PLMN is a visited PLMN (VPLMN) and the second PLMN is a home PLMN (HPLMN), wherein the first access network is a 3rd Generation Partnership Project (3GPP) access network, and wherein the second access network is a wireless local area network (WLAN) access network;

determining, by the UE according an access network discovery and selection function (ANDSF) policy of the first PLMN, to initiate a data stream offloading operation on the second network type, wherein determining to initiate the data stream offloading operation comprises determining, by the UE according to the ANDSF policy of the VPLMN, to initiate WLAN offloading; and performing, by the UE, the data stream offloading operation on the second network type of the second PLMN according to an ANDSF policy of the second PLMN, wherein performing the data stream offloading operation according to the ANDSF policy of the HPLMN comprises performing, by the UE according to the ANDSF policy of the HPLMN, an operation of offloading a data stream to the WLAN access network of the HPLMN.

8. The method according to claim 7, wherein performing the operation of offloading the data stream to the WLAN access network of the HPLMN comprises:

determining, by the UE according to the ANDSF policy of the HPLMN, an offloading manner in which the data stream is transmitted through the WLAN access network; and offloading, by the UE, the data stream to the WLAN access network of the HPLMN according to the offloading manner.

9. A network access processing method, comprising:
accessing, by user equipment (UE), a first visited public land mobile network (VPLMN) through a first access network of a first network type, wherein the first network type of the first access network is a wireless local area network (WLAN) access network, and accessing a second VPLMN through a second access network of a second network type, the second network type of the second access network is a 3rd Generation Partnership Project (3GPP) access network;

determining, by the UE according to an access network discovery and selection function (ANDSF) policy of the first VPLMN, to initiate a data stream offloading operation on the second network type, wherein determining to initiate the data stream offloading operation comprises determining, by the UE according to the ANDSF policy of the first VPLMN, to offload a data stream from the WLAN access network to the 3GPP access network; and performing, by the UE, the data stream offloading operation on the second network type of the second VPLMN according to an ANDSF policy of the second VPLMN, wherein performing the data stream offloading operation according to the ANDSF policy of the second VPLMN comprises performing, by the UE according to the ANDSF policy of the second VPLMN, an operation of offloading the data stream to the 3GPP access network of the second VPLMN.

10. The method according to claim 9, wherein performing the operation of offloading the data stream to the 3GPP access network of the second VPLMN comprises determining, by the UE according to the ANDSF policy of the second VPLMN, whether the data stream can be transmitted through the 3GPP access network, and offloading, by the UE and when the data stream can be transmitted through the 3GPP access network, the data stream to the 3GPP access network of the second VPLMN.

11. A network access processing method, comprising:
accessing, by user equipment (UE), a first public land mobile network (PLMN) through a first access network of a first network type, and accessing a second PLMN through a second access network of a second network type, wherein the first PLMN is a home PLMN (HPLMN) and the second PLMN is a visited PLMN (VPLMN), wherein the first access network is a wireless local area network (WLAN) access network, and wherein the second access network is a 3rd Generation Partnership Project (3GPP) access network;

determining, by the UE according an access network discovery and selection function (ANDSF) policy of the first PLMN, to initiate a data stream offloading operation on the second network type, wherein determining to initiate the data stream offloading operation comprises determining, by the UE according to the ANDSF policy of the HPLMN, to offload a data stream from the WLAN access network to the 3GPP access network; and performing, by the UE, the data stream offloading operation on the second network type of the second PLMN according to an ANDSF policy of the second PLMN, wherein performing the data stream offloading operation according to the ANDSF policy of the VPLMN comprises performing, by the UE according to the ANDSF policy of the VPLMN, an operation of offloading the data stream to the 3GPP access network of the VPLMN.

12. The method according to claim 11, wherein before performing the operation of offloading the data stream to the 3GPP access network of the VPLMN, the method further comprises performing, by the UE, 3GPP access network discovery and selection according to the ANDSF policy of the HPLMN, and determining to offload the data stream to the 3GPP access network of the VPLMN.

* * * * *

UNITED STATES PATENT AND TRADEMARK OFFICE
CERTIFICATE OF CORRECTION

PATENT NO. : 9,906,984 B2
APPLICATION NO. : 14/827664
DATED : February 27, 2018
INVENTOR(S) : Xiaoyan Duan et al.

Page 1 of 1

It is certified that error appears in the above-identified patent and that said Letters Patent is hereby corrected as shown below:

On the Title Page

On page 2 Column 2, Lines 31-33: under Other Publications should read:
Foreign Communication From a Counterpart Application, PCT Application No. PCT/CN2014/072073, English Translation Of Written Opinion dated April 30, 2014, 10 pages.

Signed and Sealed this
Twenty-fourth Day of April, 2018

Andrei Iancu
*Director of the United States Patent and Trademark Office*